US006745207B2

(12) United States Patent
Reuter et al.

(10) Patent No.: US 6,745,207 B2
(45) Date of Patent: Jun. 1, 2004

(54) SYSTEM AND METHOD FOR MANAGING VIRTUAL STORAGE

(75) Inventors: James E. Reuter, Colorado Springs, CO (US); David W. Thiel, Colorado Springs, CO (US); Richard F. Wrenn, Colorado Springs, CO (US); Andrew C. St. Martin, Las Vegas, NV (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 424 days.

(21) Appl. No.: 09/872,583

(22) Filed: Jun. 1, 2001

(65) Prior Publication Data

US 2002/0019908 A1 Feb. 14, 2002

Related U.S. Application Data

(60) Provisional application No. 60/209,108, filed on Jun. 2, 2000.

(51) Int. Cl.[7] .............................................. G06F 12/00
(52) U.S. Cl. ......................... 707/200; 709/1; 707/203; 707/100
(58) Field of Search .................... 707/1–10, 100–104.1, 707/200; 700/19–20, 245, 248; 709/1, 100, 223–226, 227–229, 321–327; 711/1–6, 100, 200, 203, 209

(56) References Cited

U.S. PATENT DOCUMENTS

| | | | | |
|---|---|---|---|---|
| 5,226,141 A | * | 7/1993 | Esbensen | |
| 5,392,244 A | * | 2/1995 | Jacobson et al. | |
| 5,408,630 A | * | 4/1995 | Moss | |
| 5,485,321 A | * | 1/1996 | Leonhardt et al. | |
| 5,542,065 A | * | 7/1996 | Burkes et al. | |
| 5,546,557 A | * | 8/1996 | Allen et al. | |
| 5,546,558 A | * | 8/1996 | Jacobson et al. | |
| 5,574,862 A | * | 11/1996 | Marianetti | |
| 5,617,552 A | * | 4/1997 | Garber et al. | |
| 5,651,133 A | * | 7/1997 | Burkes et al. | |
| 5,918,229 A | * | 6/1999 | Davis et al. | |
| 6,269,431 B1 | * | 7/2001 | Dunham | |
| 6,321,276 B1 | * | 11/2001 | Forin | |
| 6,343,324 B1 | * | 1/2002 | Hubis et al. | 709/229 |
| 6,389,432 B1 | * | 5/2002 | Pothapragada et al. | 707/205 |
| 6,460,113 B1 | * | 10/2002 | Schubert et al. | 711/111 |
| 6,538,669 B1 | * | 3/2003 | Lagueux et al. | 345/764 |
| 6,633,962 B1 | * | 10/2003 | Burton et al. | 711/163 |
| 6,640,278 B1 | * | 10/2003 | Nolan et al. | 711/6 |
| 6,647,387 B1 | * | 11/2003 | McKean et al. | 707/9 |
| 6,654,830 B1 | * | 11/2003 | Taylor et al. | 710/74 |

OTHER PUBLICATIONS

Verita, "Applications in Storage Area Networking, Using Storage Management Software in Today's SAN Enviroment", Verita Software Corp., Feb. 2000, pp. 1–11.*
Kenneth Jensen, "Managing the SAN", Gadzoox Networks Inc., 1999, pp. 1–12.*
Montague, Robert M. et al., Virtualizing the SAN, Morgan Keegan & Company, Inc., Jul. 5, 2000, pp. 1–20.

* cited by examiner

Primary Examiner—Greta Robinson
Assistant Examiner—Linh Black

(57) ABSTRACT

Preferred embodiments of the present invention provide a system and method for the management of virtual storage. The system and method include an object-oriented computer hardware/software model that can be presented, for example, via a management interface (e.g., via graphical user interfaces, command line interfaces, application programming interfaces, etc.). In some preferred embodiments, the model separates physical storage management from virtual disks presented to hosts and management can be automated such that the user (e.g., customer, manager and/or administrator) specifies goals rather than means—enhancing ease of use while maintaining flexible deployment of storage resources.

18 Claims, 28 Drawing Sheets

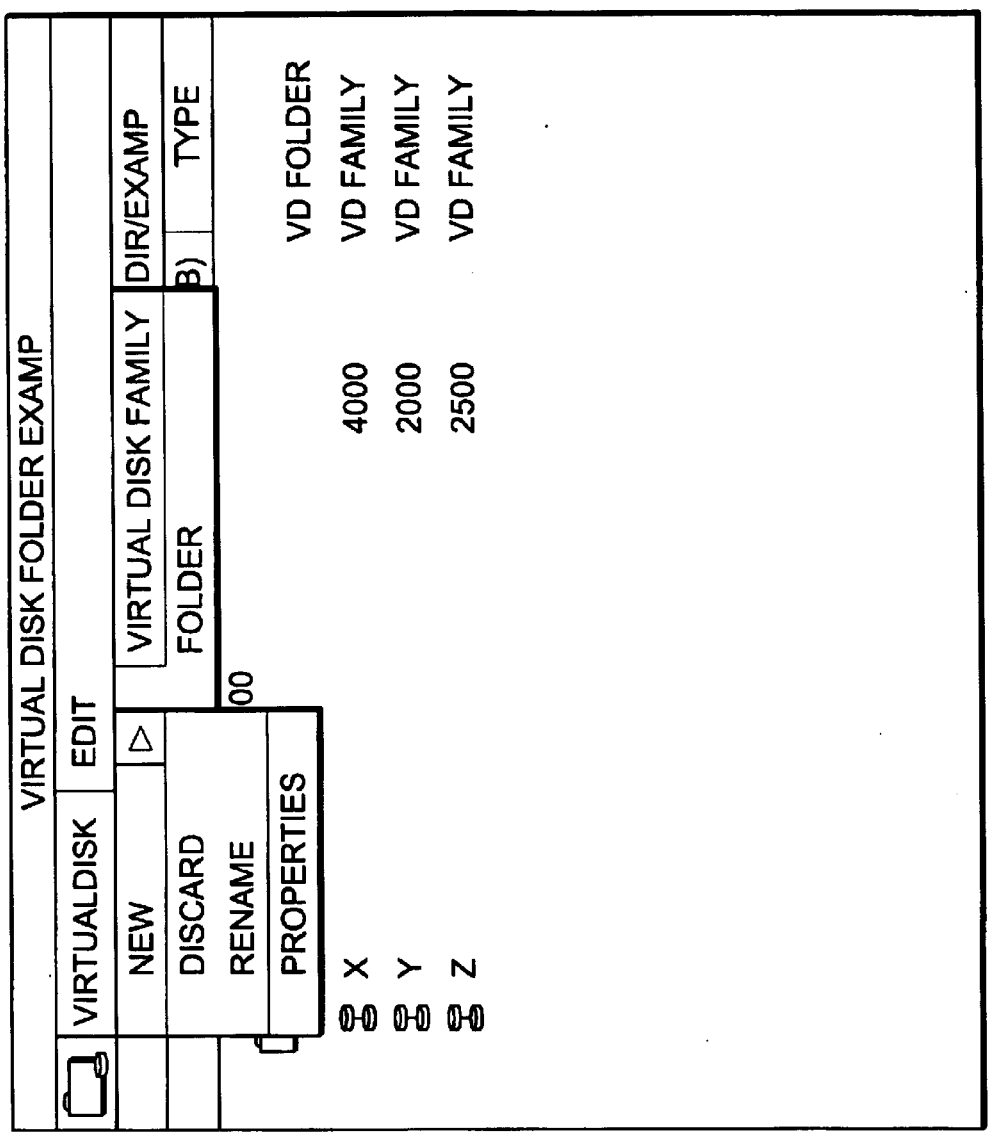
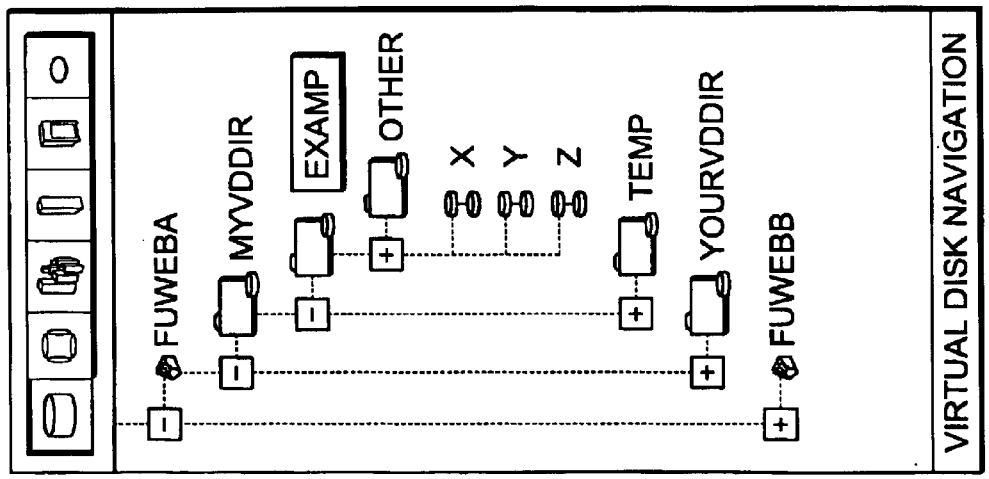
Fig. 8

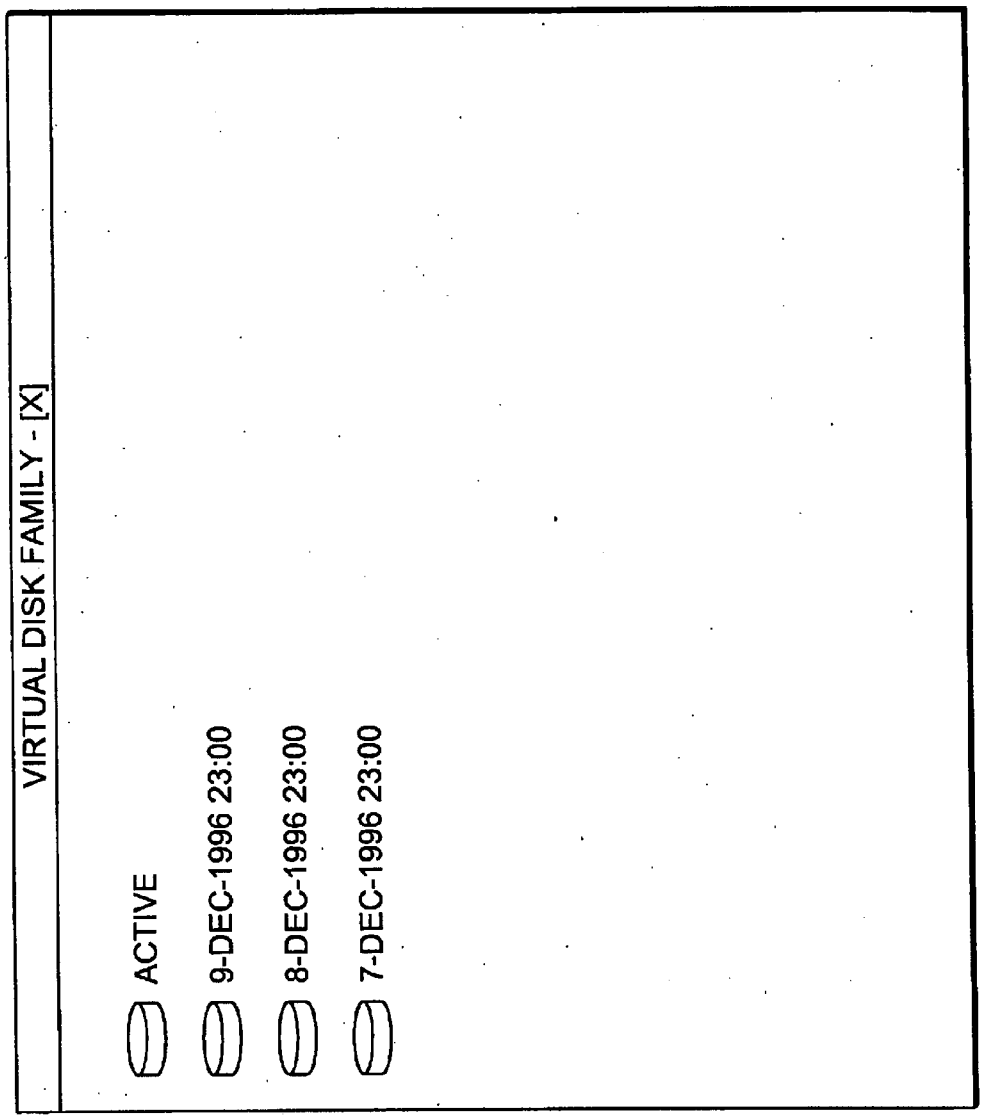
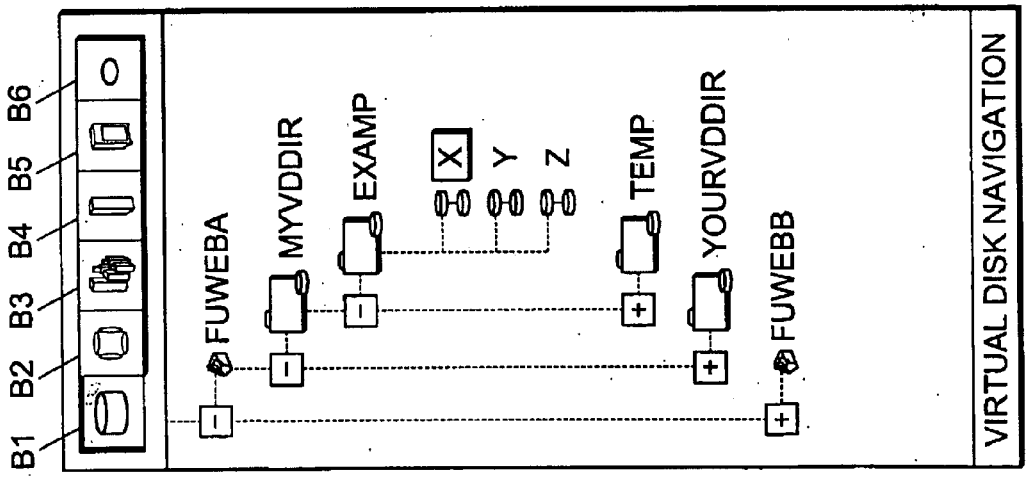
Fig. 16

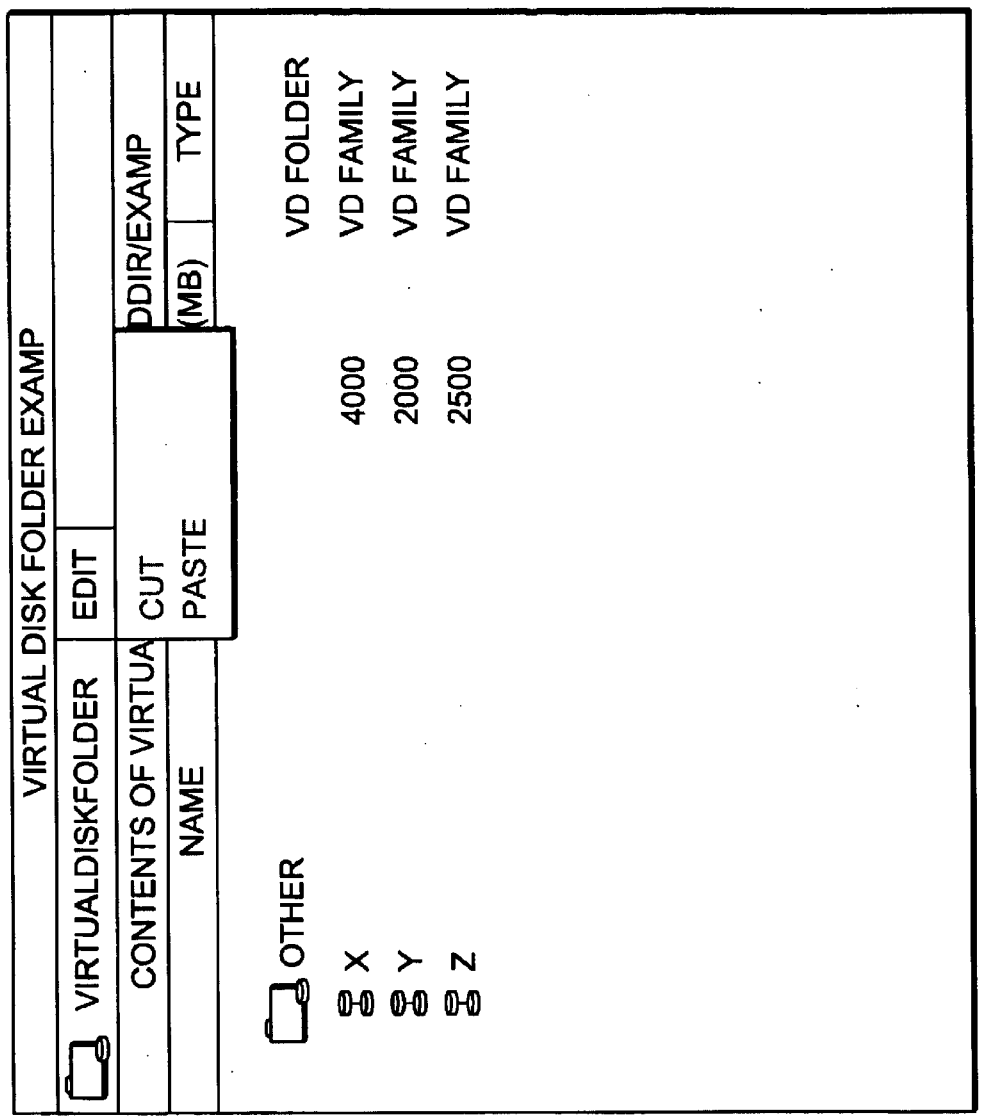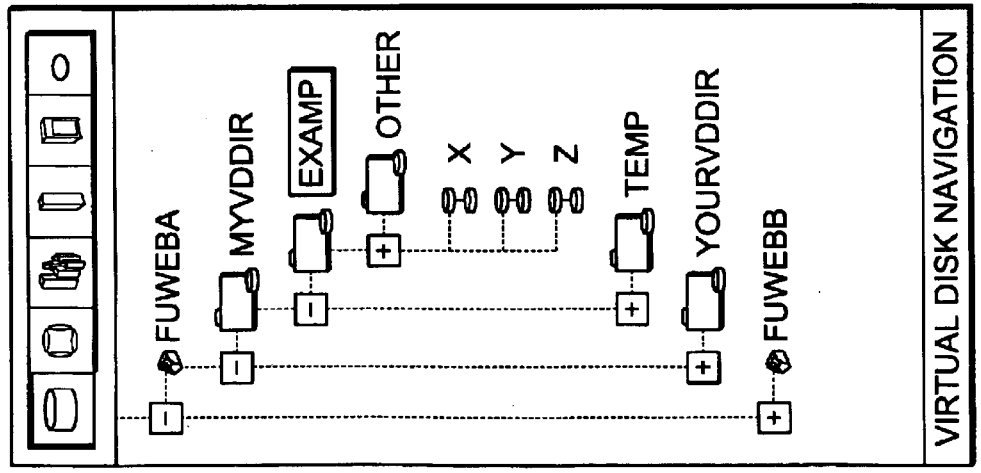
Fig. 21

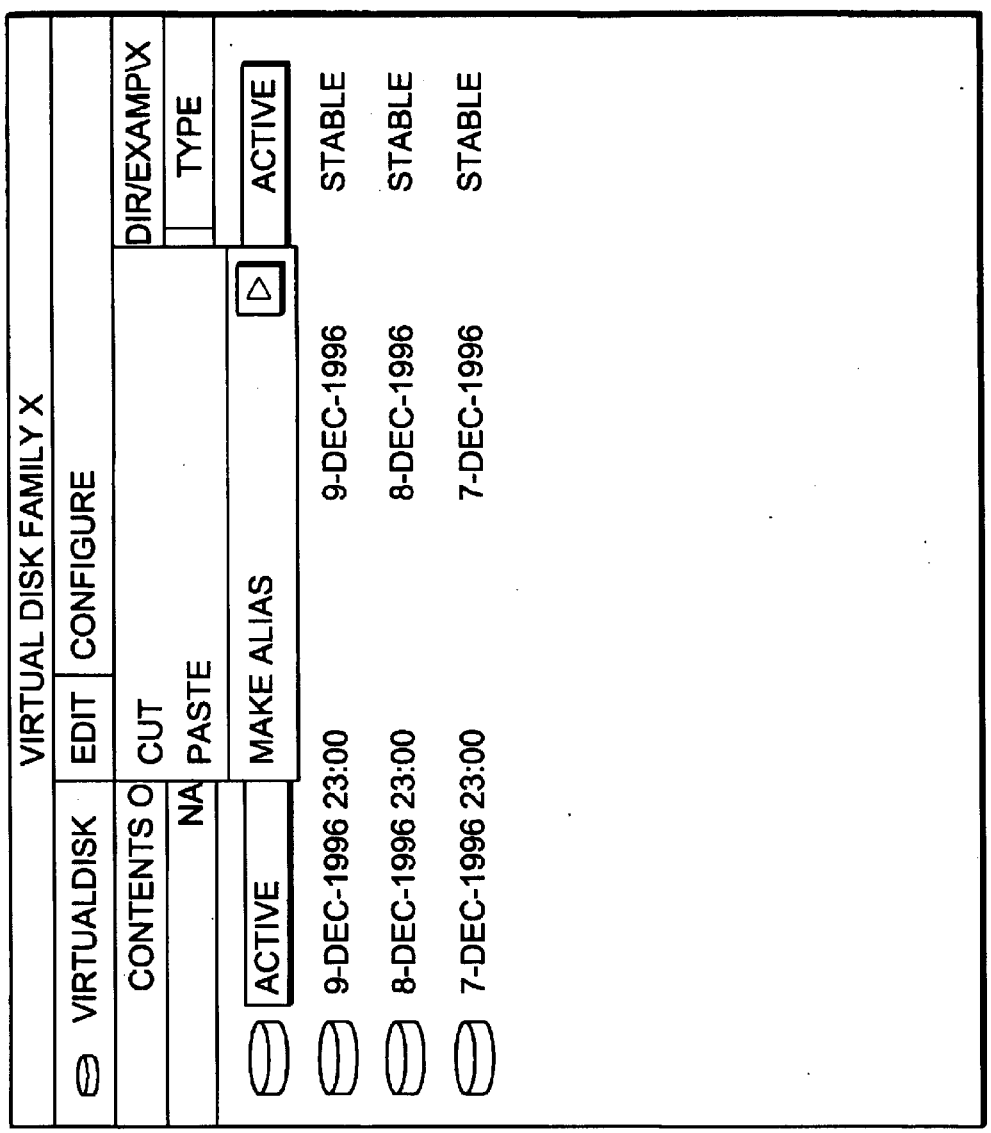
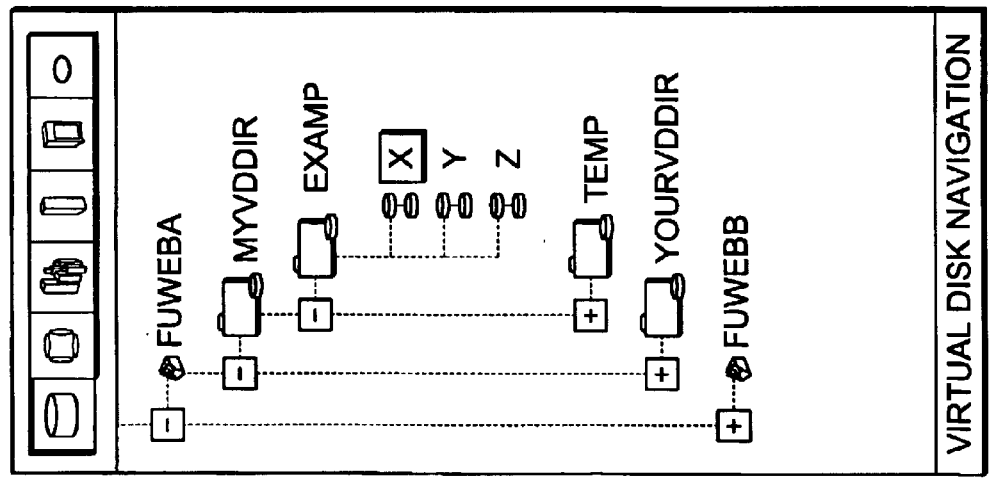
Fig. 24

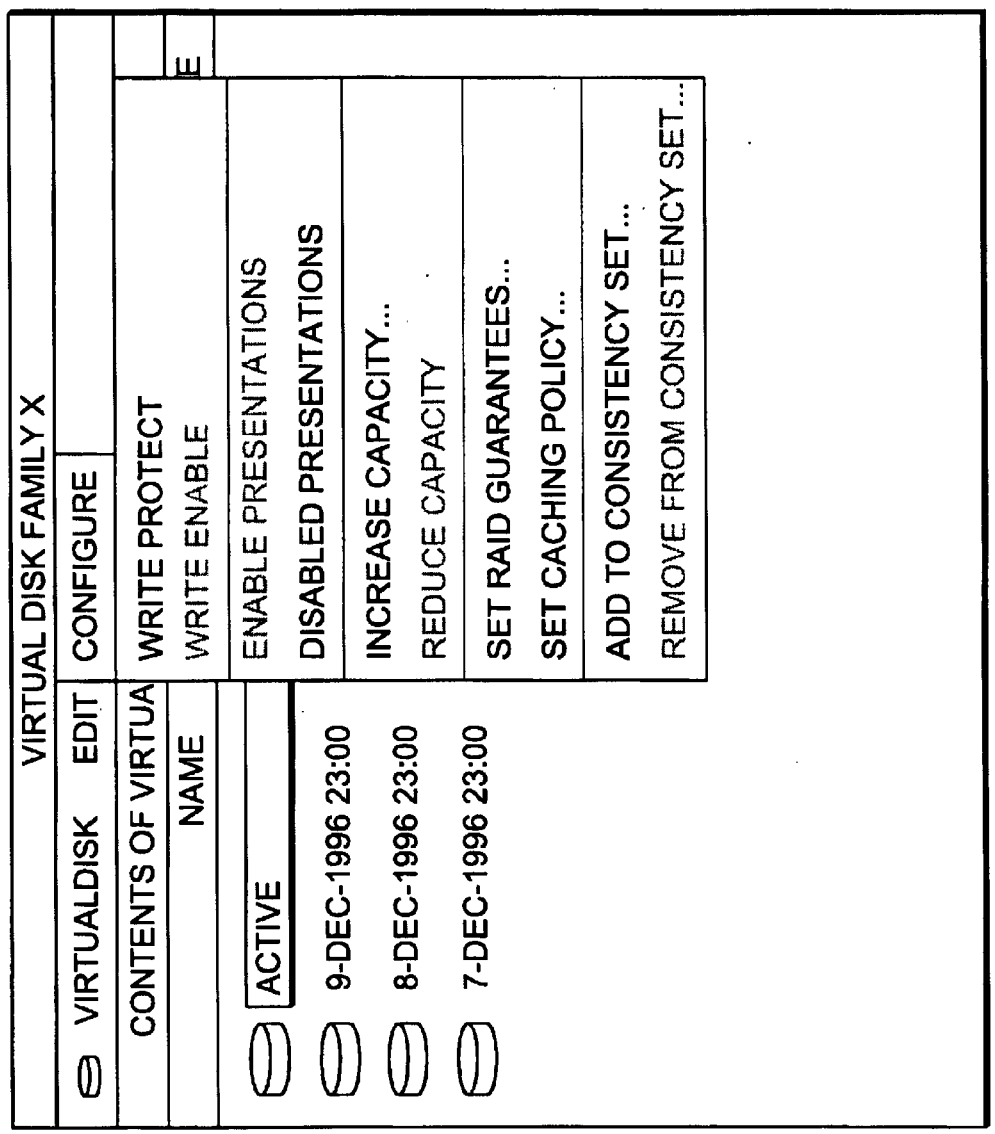
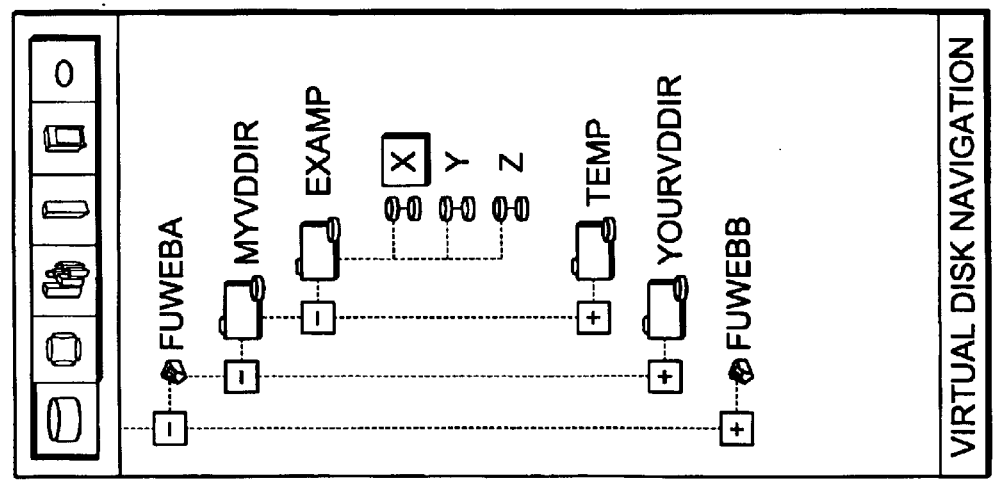
Fig. 25

| VIRTUAL DISK PROPERTIES -- [SALES_DATA\ACTIVE] | | | | | ? | X |
|---|---|---|---|---|---|---|
| GENERAL | UNIT ACCESS | UNIT PROTOCOL | PERFORMANCE | SNAPSHOT | | |
| RAID | CACHING | REPLICATION | ? | ? | | |

CONFIGURATION
CAPACITY                    [ 3500  MEGABYTES ] ▲▼

STORAGE ALLOCATION POLICY:    ⦿ ALLOCATE ON DEMAND
                              ○ FULLY ALLOCATED
                              ○ FULLY RESERVED

ACCESS:                       ⦿ READ-WRITE
                              ○ READ-ONLY

STATE:                        ⦿ PRESENTATIONS ENABLED
                              ○ PRESENTATIONS DISABLED
                              ○ MARKED FOR DELETE

INFORMATION
ALLOCATED CAPACITY:           671 MEGABYTES
DISK STORAGE ALLOCATED:       1342 MEGABYTES
CONDITION:                    NORMAL

CREATION DATE:                27-JUN-1997 10:37:49
MODIFICATION DATE:            25-AUG-1997 8:03:45
LAST ACCESS DATE:             29-SEP-1997 20:13:12
MARKED FOR DELETE DATE:       N/A

[ OK ]    [ CANCEL ]

Fig. 26

VIRTUAL DISK PROPERTIES – [SALES_DATA\ACTIVE]

| GENERAL | CACHING | REPLICATION | ? | SNAPSHOT |
|---|---|---|---|---|
| RAID | UNIT ACCESS | UNIT PROTOCOL | PERFORMANCE | |

ADD NEW ACCESS TO UNIT:

HOST SYSTEM: [          ] [ BROWSE ]

ACCESS: READ-WRITE: ⦿  READ-ONLY: ○

UNIT PROTOCOL: ENABLED: ⦿  DISABLED: ○

| TYPE | NAME | ID | ACCESS |
|---|---|---|---|
| SCSI-3 | DISK 29 | 14-79-32-53 | READ-WRITE |
| BLOCKMUX | DASD 15 | 14-58-AB-4 | READ-ONLY |

[ ADD ]

EXISTING ACCESS:

| HOST SYSTEM | ACCESS | UNIT NAME | UNIT TYPE | UNIT ID |
|---|---|---|---|---|
| \\BEATLES\JOHN | READ-WRITE | DISK 29 | SCSI-3 | 14-79-32 |
| \\BEATLES\PAUL | READ-WRITE | DISK 29 | SCSI-3 | 14-79-32 |
| \\BEATLES\GEORGE | READ-WRITE | DISK 29 | SCSI-3 | 14-79-32 |
| \\BEATLES\RINGO | READ-WRITE | DISK 29 | SCSI-3 | 14-79-32 |
| \\STONES\MICK | READ-ONLY | DASD 15 | BLOCKMUX | 14-58-AB |

[ MODIFY ]  [ DELETE ]

[ OK ]  [ CANCEL ]

*Fig. 27*

| GENERAL | CACHING | REPLICATION | ? | ? | ? |
|---|---|---|---|---|---|
| RAID | UNIT ACCESS | UNIT PROTOCOL | PERFORMANCE | SNAPSHOT | |

VIRTUAL DISK PROPERTIES -- [SALES_DATA:ACTIVE]

CREATE NEW UNIT PROTOCOL:

ACCESS: READ-WRITE: ● READ-ONLY: ○

UNIT TYPE: SCSI-3 ▽

UNIT NAME: [ ] NEW

EXISTING UNIT PROTOCOLS:

| TYPE | NAME | ID | ACCESS | REF. CNT. |
|---|---|---|---|---|
| SCSI-3 | DISK 29 | 14-79-32-53-7B- | READ-WRITE | 4 |
| BLOCKMUX | DASD 15 | 14-58-AB-49-C7 | READ-ONLY | 1 |

MODIFY DELETE

OK CANCEL

SYSTEM AND METHOD FOR MANAGING VIRTUAL STORAGE

RELATED APPLICATIONS

This application claims priority to U.S. Provisional Application No. 60/209,108, filed on Jun. 2, 2000, entitled Structure For Managing The Virtualization Of Block Storage, the disclosure of which is hereby incorporated by reference in its entirety. Additionally, the entire disclosures of the present assignee's following utility patent applications filed on the same date as the present application are both incorporated herein by reference in their entireties: Ser. No.: 09/872,921, to James Reuter, et al., entitled Structure And Process For Distributing SCSI LUN Semantics Across Parallel Distributed Component; and Ser. No.: 9/872,721, to James Reuter, et al., entitled Data Migration Using Parallel, Distributed Table Driven I/O Mapping.

FIELD OF THE INVENTION

The present invention relates to systems and methods for managing virtual disk storage provided to host computer systems.

BACKGROUND OF THE INVENTION

Virtual disk storage is relatively new. Typically, virtual disks are created, presented to host computer systems and their capacity is obtained from physical storage resources in, for example, a storage area network.

In storage area network management, for example, there are a number of challenges facing the industry. For example, in complex multi-vendor, multi-platform environments, storage network management is limited by the methods and capabilities of individual device managers. Without common application languages, customers are greatly limited in their ability to manage a variety of products from a common interface. For instance, a single enterprise may have NT, SOLARIS, AIX, HP-UX and/or other operating systems spread across a network. To that end, the Storage Networking Industry Association (SNIA) has created work groups to address storage management integration. There remains a significant need for improved management systems that can, among other things, facilitate storage area network management.

While various systems and methods for managing array controllers and other isolated storage subsystems are known, there remains a need for effective systems and methods for representing and managing virtual disks in various systems, such as for example, in storage area networks.

SUMMARY OF THE INVENTION

In response to these and other needs, the preferred embodiments of the present invention provide a system and method for the management of virtual storage. The system and method include an object-oriented computer hardware/software model that can be presented via a management interface (e.g., via graphical user interfaces, GUIs, command line interfaces, CLIs, application programming interfaces, APIs, etc.), via documents (e.g., customer documents, training documents or the like, including electronic documents, such as Word documents, PDF files, web pages, etc., or physical documents), or via other means.

In preferred embodiments, the model advantageously provides the separation of physical storage management from virtual disks presented to the hosts. This is preferably done using virtual disks in conjunction with a storage pool hierarchy. The virtual disk can be a logical "disk" that is visible to one or more host system(s). It is independent of physical storage and is preferably managed by setting attributes. On the other hand, the storage pool hierarchy provides a boundary between the virtual and physical parts of the model via "encapsulation" of physical storage such that physical components may change without affecting the virtual parts of the model.

Preferably, management can be automated such that the user (e.g., customer, manager and/or administrator) specifies goals rather than means—enhancing ease of use while maintaining flexible deployment of storage resources. The preferred embodiments of the invention may advantageously reduce the cost and/or complexity of managing storage—by simplifying the management of change. In preferred embodiments, one or more of the following and other advantages can be realized with the present invention.

Erased Boundaries

Typically, storage controller or subsystem boundaries can cause inefficient use of capacity, capacity to be in the wrong place, manual rebalancing to be required and/or problems with host access to capacity. The preferred embodiments of the present invention can enable, for example, a host-independent, controller-independent, storage area network (SAN)-wide pool of storage for virtual disks, effectively erasing these boundaries and the problems caused by these boundaries. Among other things, this can also simplify the acquisition and deployment of new storage because new storage can simply be more capacity in the pool.

Centralized Management

Typically, each storage subsystem in a SAN is managed separately, causing boundaries in the management model with resulting complexities and inefficiencies of management. The preferred embodiments of the present invention enable, among other things, a single, central management view of an entire SAN.

Uniform Capabilities

Typically, when a SAN has multiple storage subsystems, the subsystems may have different capabilities, adding complexity and confusion to the management of the storage and the hosts using the storage. The preferred embodiments of the present invention can provide, e.g., a virtual disk that has uniform management capabilities and that is independent of the capabilities offered by the subsystems providing the capacity. Among other things, this can reduce management complexity. With the preferred embodiments of the present invention, virtual disks can be managed with attributes that are independent of the physical storage, separating the virtual parts of the model from the physical parts of the model.

The preferred embodiments of the present invention can enable features such as: a) substantially no disruption of service to host systems and applications during management operations; b) easy to add/remove storage subsystems; c) more efficient use of space; d) less wasted space overhead; e) volume expansion; f snapshot copies; g) selective presentation of virtual disks only to desired hosts; h) attribute-based management of virtual disks; i) host systems de-coupled from storage management; and/or j) future extensions easily added without disruption to hosts or to storage subsystems.

The above and other embodiments, features and advantages will be further appreciated upon review of the following description of the preferred embodiments in conjunction with the accompanying drawings.

BRIEF DESCRIPTION OF THE DRAWINGS

Preferred embodiments of the invention are shown by way of example and not limitation in the accompanying drawings in which like reference numbers represent like parts throughout and in which:

FIGS. 8 to 15 illustrate graphical user interfaces that can be provided to facilitate management of virtual storage in relation to the creation of a virtual disk in some illustrative embodiments of the invention;

FIGS. 16 to 18 illustrate some exemplary navigational views that can be presented to a user to facilitate management of the storage system in some illustrative embodiments of the invention; and FIGS. 19 to 29 illustrate some exemplary disk management and properties views that can be presented to a user to facilitate management and selection of disk properties in some illustrative embodiments of the invention.

DETAILED DESCRIPTION OF THE PREFERRED EMBODIMENTS

I. Preferred Environments (e.g., Storage Area Networks)

The present invention can be applied in a wide range of systems, e.g., in storage area network (SAN) systems and in other environments. In some embodiments, the present invention can be applied in, e.g., heterogeneous SAN environments (e.g., at the storage level). In some other embodiments, the present invention can be applied in, e.g., open SAN environments (e.g., at the fabric level). In some other embodiments, the present invention can be applied in, e.g., non-SAN environments (e.g., at the server level). The present invention can also be applied in various systems shown in the above-identified patent applications incorporated herein-by-reference and in other systems as would be apparent to those in the art based on this disclosure.

Figure 1:
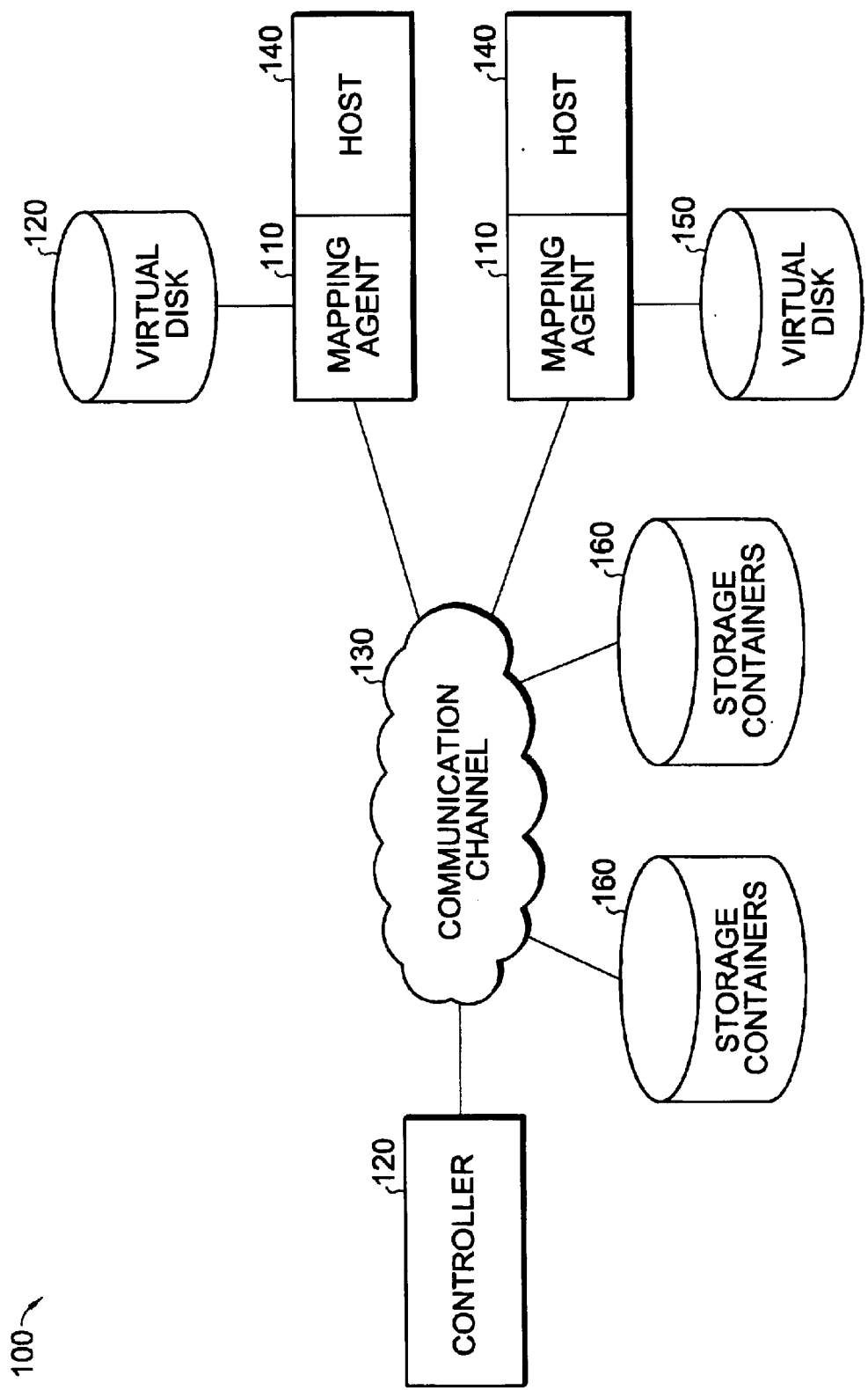
FIG. 1 is a schematic illustration of a distributed virtual storage network.

In some non-limiting preferred embodiments, the present invention can be applied in a virtualized storage area network (SAN) system 100 using one or more distributed mapping tables, as needed to form one or more virtual disks for input/output (I/O) operations between hosts and storage containers 160, as illustrated in FIG. 1. In particular, the table contains a mapping that relates a position in a virtual disk 150 with an actual location on the storage containers 160.

The system 100 principles of distributed, virtual table mapping can be applied to any known SAN. It should therefore be appreciated that the storage devices are known technologies and may refer to any type of present or future known programmable digital storage medium, including but not limited to disk and tape drives, writeable optical drives, etc. Similarly, the hosts 140 may be any devices, such as a computer, printer, etc., that connect to a network to access data from a storage device.

Likewise, the storage network is also intended to include any communication technology, either currently known or developed in the future, such as the various implementations of Small Computer Systems Interface (SCSI) or Fibre Channel. This distributed virtualization is most useful in environments where a large amount of storage is available and connected using some sort of "storage network" infrastructure. One preferred implementation uses Switched Fibre-Channel connected storage. However, nothing in the design of the system 100 precludes its use on other types of storage networks, including storage networks that are not yet invented.

The hosts access the table through multiple mapping agents 110. The system 100 uses multiple agents 110 that are associated with the hosts 140. Preferably, each host has a separate agent 110, but the system 100 could be easily configured so that more than one host 140 connects to an agent 110. If multiple hosts 140 connect to the same agent 110, the hosts 140 may share that agent's mapping table (alternately, there may be independent tables per host). The agent 110 stores the mapping table in volatile memory such as DRAM. As a result, if one of the agents 110 loses power, that agent 110 loses its copy of the table. Such an event could take place if the mapping agent 110 is embedded in the host 140, for example, a backplane card serving as the mapping agent 110, and the host 140 system loses power.

By storing the mapping table in volatile memory, the table can be easily and rapidly accessed and modified on the agents 110. Storing the mapping table in volatile memory has the further advantage of substantially reducing the cost and complexity of implementing the agents 110 as mapping agents. Overall, the agents 110 allow the performance-sensitive mapping process to be parallelized and distributed optimally for performance. The mapping agents 110 reside on a host 140 and are in communication with a virtual disk drive 150.

The system 100 further comprises a controller 120 that is separate from the mapping agents 110. The controller 120 administers and distributes the mapping table to the agents 110. Control of the mapping table is centralized in the controller 120 for optimal cost, management, and other implementation practicalities. The controller 120 further stores the mapping table in a semi-permanent memory, such as a magnetic disk or an EPROM, so that the controller 120 retains the table even after a power loss. In this way, the responsibility for persistent storage of mapping tables lies in the controller 120 so that costs and complexity may be consolidated. Any controller 120 known in the art of digital information storage may be employed as needed to implement the present invention. Within this framework, each of the mapping agents 110 preferably interacts only with the controller 120 and not with the other agents 110. Furthermore, the architecture allows for a controller 120 comprised of redundant, cooperating physical elements that are able to achieve very high availability. As a result, the system 100 is highly scaleable and tolerant of component failures.

The interactions of the controller 120 and the agents 110 are defined in terms of functions and return values. In a distributed system, this communication is implemented with messages on some sort of network transport such as a communication channel 130. The communication channel 130 may employ any type of known data transfer protocol, such as TCP/IP. In one implementation, the communication channel 130 is the storage network itself. The communication channel 130 has access to non-virtual storage containers 160. Any suitable technique may be used to translate commands, faults, and responses to network messages.

II. Preferred Management Model

Figure 2:
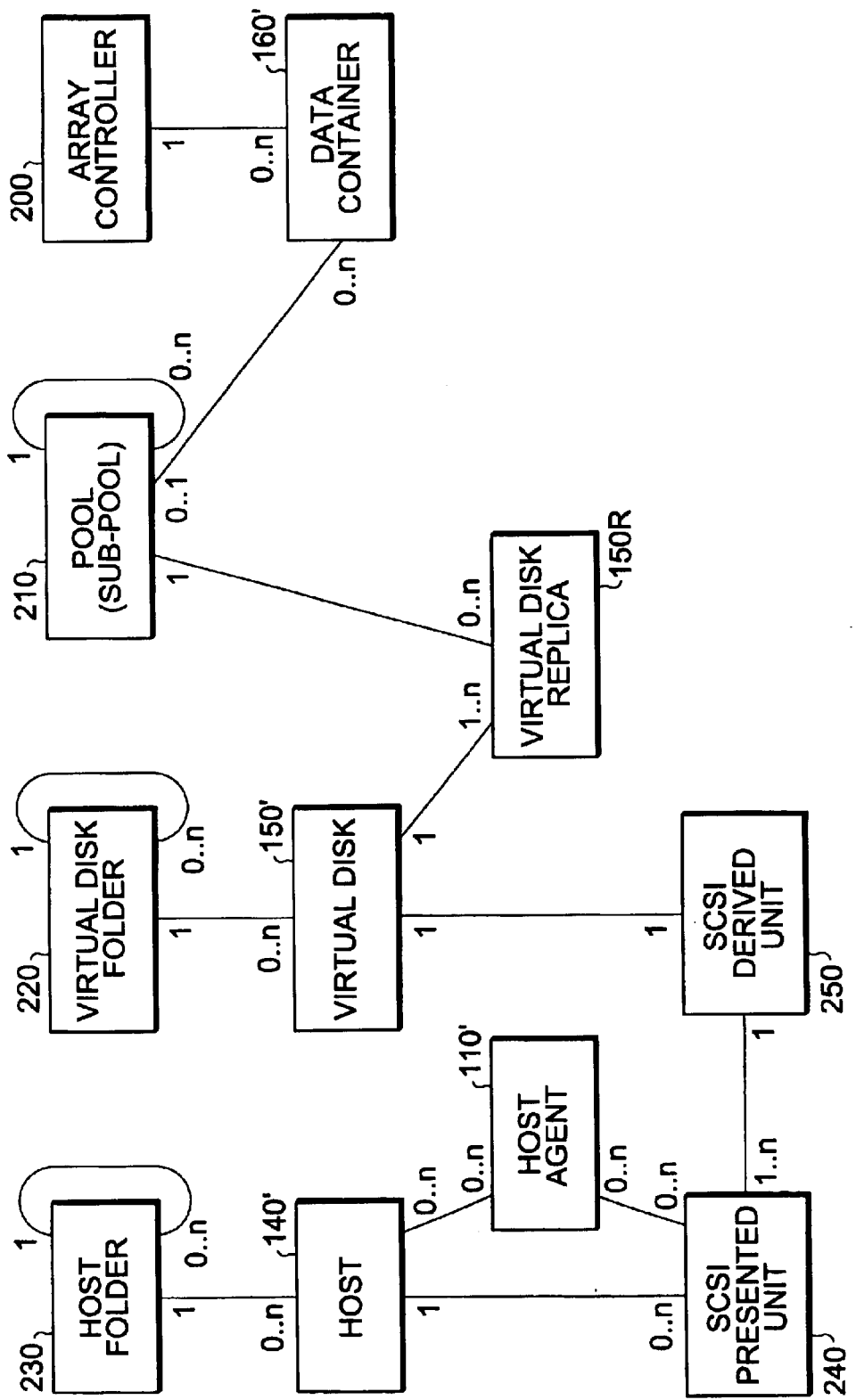
FIG. 2 is a schematic illustration of a preferred object-oriented model of the present invention.

FIG. 2 illustrates an object-oriented model employed in some preferred embodiments of the invention. The objects in the illustrated model are described in detail below. The objects include operations that either humans or automated policy can invoke—e.g., based on the model, a user (e.g., a system administrator) can assign storage resources via a system management interface.

As shown, the host folder, the virtual disk folder, and the storage pool objects can reference themselves. That is, multiple instances of these objects can be referenced under the same object type. This captures the notion of a tree-structured hierarchy. For example, the folder object representing the root of the tree always exists and sub-folders can be created as needed. This is generally analogous to a WINDOWS folder hierarchy, which is also a tree structure. A WINDOWS EXPLORER folder browser interface, for example, would be an illustrative graphical user interface representation of this kind of structure. Similarly, command line interfaces may support this concept with a notion such as "current directory."

Host

The host object 140' represents a host system (e.g., a computer, etc.) that consumes a virtual disk and supports one or more applications.

Host Agent

The host agent object 110' is a component that provides virtualizing capability to the hosts (e.g., a "mapping agent"). A host has zero or more host agents through which virtual disks can be presented to that host. If a host has zero associated agents, presentation is not possible. The model preferably allows this because there may be temporary situations where a host does not have an agent (e.g., one has not been added or repaired). A host agent may serve multiple hosts or, alternatively, a host agent may attach to only a single host.

The presented unit, described below, references all host agents through which a host may be reached for a given virtual disk. A host agent may be used by zero or more presented units to present zero or more virtual disks to a host.

Virtual Disk

The virtual disk object 150' represents a block-store disk as seen by a host system. It is independent of physical storage and is a logical object that contains the data that the system stores on behalf of host systems.

Virtual disk service operations are preferably similar to those of a locally attached physical disk. A virtual disk can include, for example, a compact (non-sparse) linear array of fixed-size data blocks indexed by nonnegative integers, which may be read or written. A read operation transfers the data from a set of consecutively indexed data blocks to the host system. A write operation transfers data from the host system to a set of consecutively indexed data blocks.

While a virtual disk can be seen by host systems as a compact linear array of blocks, an implementation may save space by not allocating physical storage to any block that has never been written. Read operations issued to blocks that have never been written can, for example, transfer a block of all zeros. In some embodiments, several virtual disks may share resources. Preferably, however, such virtual disks behave similarly to independent physical disks as seen through the service interface.

In contrast to typical service operations, virtual disk management operations can be unique. For example, the notion of performing a snapshot operation is foreign to today's physical disks. Many management operations can treat virtual disks like independent objects, which can be desirable because customers understand physical disks to be independent objects. However, other operations can either expose or control relationships between virtual disks. These relationships include temporal relationships, shared capacity relationships, performance interdependencies, data reliability co-dependencies, availability co-dependencies and/or other relationships.

Derived Unit

The derived unit object 250 adds protocol personality (e.g., SCSI, Fiber Channel, CI, etc.) to a block-store represented by the virtual disk—i.e., the derived unit supplies the I/O protocol behavior for the virtual disk. When a virtual disk is presented to a host, a derived unit is created to add semantics (e.g., SCSI) to the block storage provided by the virtual disk.

If desired, more than one derived unit can be allowed per virtual disk, such as for such cases where an administrator wants to treat these as independent disks that happen to have shared contents. However, this may be of limited use in some cases and products can be made that will only allow one derived unit per virtual disk. Preferably, a derived unit is always associated with only one virtual disk.

While some illustrative derived units involve SCSI protocols, the architecture allows for derived units for protocol types other than SCSI. The SCSI model can be selected, for example, where host driver stacks support the SCSI model. However, a host-attached mapping agent can provide any interconnect model desired to a host depending on circumstances.

Additionally, SCSI disks, for example, may have mode pages, reservation stacks and geometry information in addition to the information stored in their data blocks. In some illustrative and non-limiting examples, the derived unit may provide storage to capture persistent information related to a host-storage interconnect used to access the virtual disk—e.g., when a virtual disk is accessed via a SCSI interconnect, the derived unit can provide a place to store the SCSI mode pages associated with that virtual disk.

Presented Unit

The presented unit object 240 provides an association between a host or group of hosts and a derived unit. This association allows a host or a specific group of hosts to access a derived unit and its underlying virtual disk. In the system, there may be many hosts. Often, such hosts are non-cooperating. Accordingly, it is preferred that virtual disks be selectively presented to hosts. The derived unit of a virtual disk may be presented to several hosts and not presented to others. In some embodiments, individual hosts may be members of a host group. Hosts or host groups to which a derived unit is not presented have no knowledge of the derived unit and its underlying virtual disk and cannot use it.

The presented unit manages presentation of virtual disks with derived unit personality (e.g., SCSI) to individual hosts. Preferably, it can manage multiple agents in a single host and multiple paths to such agents. This object is related to a virtual disk through a derived unit and it makes the virtual disk accessible over the host-storage interconnect. The presented unit defines the way that the host addresses the virtual disk and controls which hosts are authorized to access the virtual disk.

The presented unit provides the association between the virtual disk's derived unit and the host and is primarily responsible for managing the connection to the host over all available paths to all available host agents. A host may have zero or more associated presented units. Each presented unit is associated with only one derived unit, but a derived unit may be associated with multiple presented units (e.g., one for each host to which the virtual disk is presented).

The derived and presented unit objects are indirectly exposed to the user interfaces and are seen as controls to present a virtual disk to one or more host.

Virtual Disk Replica

Preferably, each virtual disk contains one or more virtual disk replica 150R. A virtual disk replica preferably contains a complete copy of the virtual disk block data. In some embodiments, only one virtual disk replica may be supported. In embodiments where only one virtual disk replica is provided per virtual disk, it may not likely be exposed in user-visible interfaces. Preferably, multiple virtual disk replicas per virtual disk are supported to enable disaster tolerant data replication.

Preferably, each virtual disk replica references a sub-pool in the storage pool hierarchy. That is, each virtual disk replica preferably has an attribute that references one sub-pool. Each sub-pool may be referenced by zero or more virtual disk replicas. The storage pool hierarchy becomes the focal point for the management flexibility, because a virtual disk replica sub-pool attribute can be changed, possibly causing the virtual disk replica storage to migrate. Similarly, the data containers and sub-pools under a sub-pool can change, possibly causing all affected virtual disk replicas to migrate.

Storage Pools

The storage pool object 210 represents a hierarchy of pools and sub-pools, forming a tree structure. The root is the entire storage pool. Preferably, any node in the tree can contain data containers. This hierarchy organizes the physical storage into a name space that is independent of physical storage but that still represents physical structure, such as storage in different rooms, buildings, sites, etc. This is useful, for example, for allocating independent storage for different virtual disk replicas of a virtual disk. As noted, one attribute of a virtual disk replica is the sub-pool from which the virtual disk replica should obtain its storage capacity. Any data containers in that sub-pool or its children is preferably eligible to provide capacity for that virtual disk replica.

With respect to the storage pool hierarchy, each sub-pool preferably references zero or more data containers (e.g., logical unit numbers (LUNs)) and each data container used for the virtual pool is preferably referenced by only one sub-pool. Data containers not used for virtual disk storage are preferably not referenced by any sub-pool.

The storage pool object is used to organize the storage available to the system. Pools contain the pools of space that are available to the system. Virtual disks are created and managed from space within storage pools. Storage pools can be organized into different categories based upon customer needs. These categories include but are not limited to reliability characteristics, business organization, physical location, and storage controller structure. Storage pools can also provide space management features. Storage pool space management can be used to determine total capacity, free space, used space, reliability characteristics and/or other things.

Storage Controller

The storage controller object 200 represents an array controller or some other type of storage subsystem that provides data containers to the storage pool. The storage controller contains the physical connections that are managed to access the storage. The storage controller contains all of the data containers presented by that storage controller. And, each data container preferably belongs to only one storage controller.

Data Container

The data container object 160' represents, for example, physical LUNs presented by a storage controller. Storage containers 160' may refer to any type of present or future known programmable digital storage medium, including but not limited to disk drives, tape drives and writeable optical drives.

Host Folder

The host folder object 230 can be used, if desired, to cope with scaling. To manage a large number of hosts, the hosts are preferably grouped into a folder hierarchy. This hierarchy helps to provide a partitioning of name spaces. As noted, host folders can contain hosts and host folders. The individual folders in the host folder hierarchy can contain zero or more host objects. Preferably, each host object is contained in only one host folder. This object can be omitted in other embodiments.

Virtual Disk Folder

Similar to the host folder object, the virtual disk folder object 220 can be used, if desired, to cope with scaling. To manage a large number of virtual disks, the virtual disks are preferably grouped into a folder hierarchy. This hierarchy helps to provide a partitioning of name spaces. This enables the arrangement of virtual disks into a hierarchical name space and is similar to a directory tree in a file system. Virtual disk folders can contain virtual disks and virtual disk folders.

This object is preferably defined by the administrator to organize and name groups of virtual disks. The name of the virtual disk folder preferably appears as an element in the virtual disk path name. The virtual disk folder allows the implementation of folder access control, default attribute values for new virtual disks created within the folder, and the ability to rename folders.

As with the host folder, each virtual disk folder can contain zero or more virtual disks, and each virtual disk is preferably contained in only one virtual disk folder. This object can also be omitted in other embodiments.

Other Aspects/Embodiments

In some preferred embodiments, a notable aspect of the above model includes the separation of physical storage management from virtual disks presented to hosts. The objects enabling this separation include the virtual disk and the storage pool hierarchy. The virtual disk is independent of physical storage and is manageable by setting attributes. The storage pool hierarchy provides the boundary between the virtual and the physical parts of the model and encapsulates the physical storage in a way that allows the physical components to change without affecting the virtual parts of the model. The physical parts of the model represent the physical components of the environment, including the storage subsystems and the storage they present. The use of hierarchical navigation provides a helpful management mechanism to traverse the group objects based upon the primary object; the system and method can, e.g., use folder objects to navigate the sub-folders and the objects within the folders.

Figure 3:
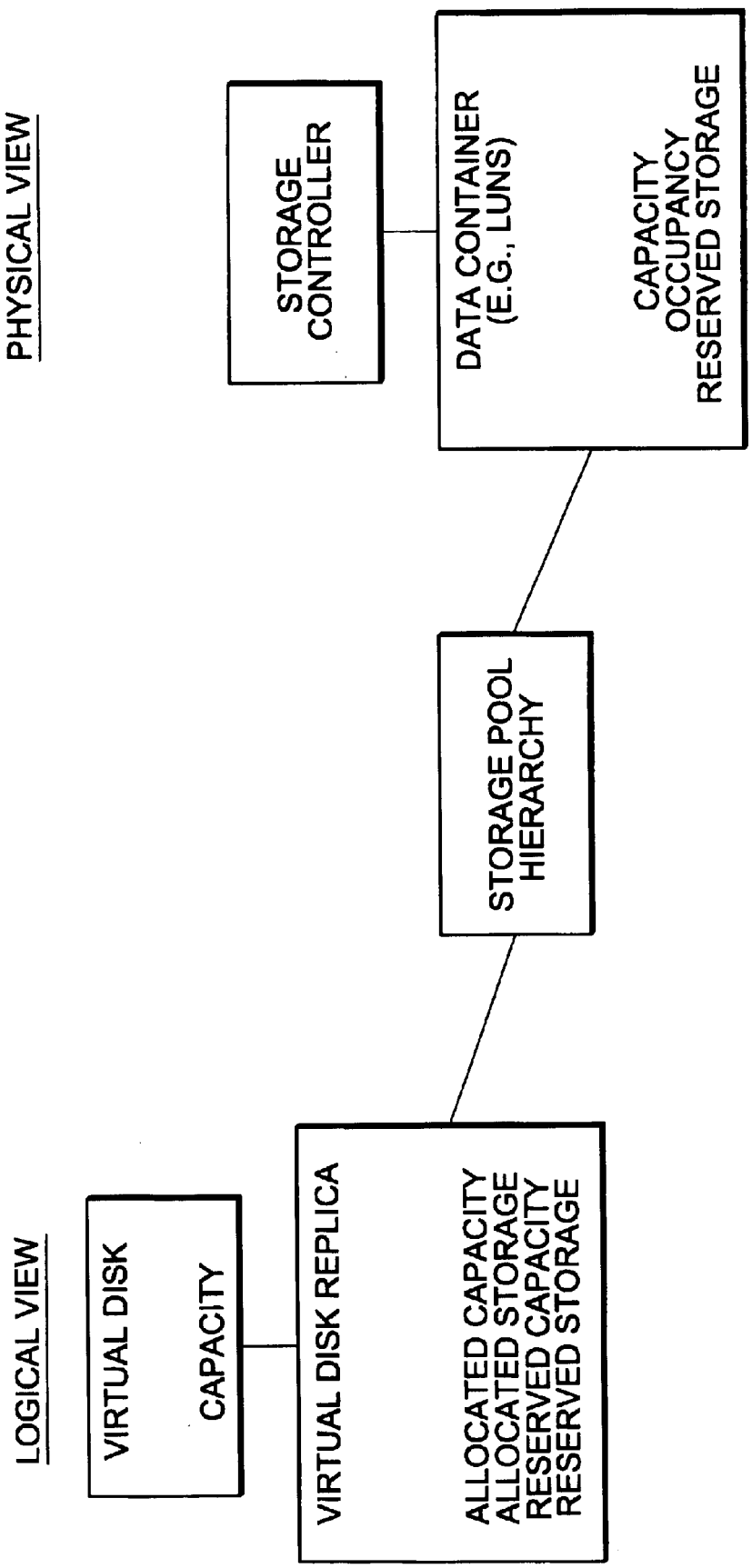
FIG. 3 is a schematic illustration of a storage pool hierarchy bridging the virtual and physical realms in preferred embodiments of the present invention.

FIG. 3 is a schematic diagram illustrating space management according to some preferred embodiments of the invention. In this figure, the two vertical columns represent the logical view and the physical view of the system. The storage-pool hierarchy provides a bridge between these two views.

In FIG. 3, "storage" is preferably used to refer to physical block storage consumed in the system. Various forms of redundancy such as RAID techniques and replication increase the amount of storage needed to contain user data.

In FIG. 3, "capacity" is preferably used to refer to the hosts'view of sizes. For example, a virtual disk is created to contain a certain capacity. The capacity of a virtual disk is only indirectly related to the amount of physical storage used to store that virtual disk.

In FIG. 3, "allocated space" is preferably space that occupies storage on the system. For example, a virtual disk that is fully allocated has sufficient blocks allocated to contain all of the user data and redundant information at the specified level of redundancy. Failures may cause allocated storage to become inaccessible or could cause the contents of allocated storage to be destroyed.

In FIG. 3, "reserved space" is preferably space that has been set aside on a system to prevent others from using it, but the specific blocks of physical stores might not yet be allocated. Preferably, when the system is operating normally, reserved space is guaranteed to be available, while failures of the underlying physical storage may cause reserved space to be unallocatable. Some differences between reserved and allocated storage can include: a) space can be reserved more quickly than it can be allocated, so this moves allocation cost from create time to first-write time; and b) if available physical storage drops below reserved storage levels, the system is more likely to continue providing virtual disk service than if physical storage drops below allocated storage levels.

In FIG. 3, "committed capacity" preferably represents the amount of capacity promised to hosts of virtual disks, whether or not it is reserved or allocated. Committed capacity is not guaranteed to be available when needed. A system that has committed more capacity than it can possibly store is said to have "over-committed" its capacity.

In FIG. 3, the uppermost object in the logical view is the virtual disk. It has a capacity and policies that decide how and when that capacity is to be allocated. Each virtual disk replica tracks allocated and reserved capacity and storage. A visible attribute is not needed, but its existence can be implied and used to track reserved storage. Preferably, volume occupancy and reserved storage is automatically adjusted any time a virtual disk is created, deleted or changes allocation.

Once again, bridging the gap between the logical and physical worlds is the storage-pool hierarchy, including, e.g., a root storage pool and child storage pools. Preferably, each storage pool computes the sum of the allocated, reserved, and available storage of its child storage pools. In addition, each storage pool preferably contains a settable attribute to track the storage committed against that storage pool. The total storage committed attribute preferably sums the storage committed attribute of a storage pool and its children. Therefore, anytime a virtual disk is created, deleted or changes allocation, the storage pool hierarchy preferably automatically reflects those changes.

Figure 4:
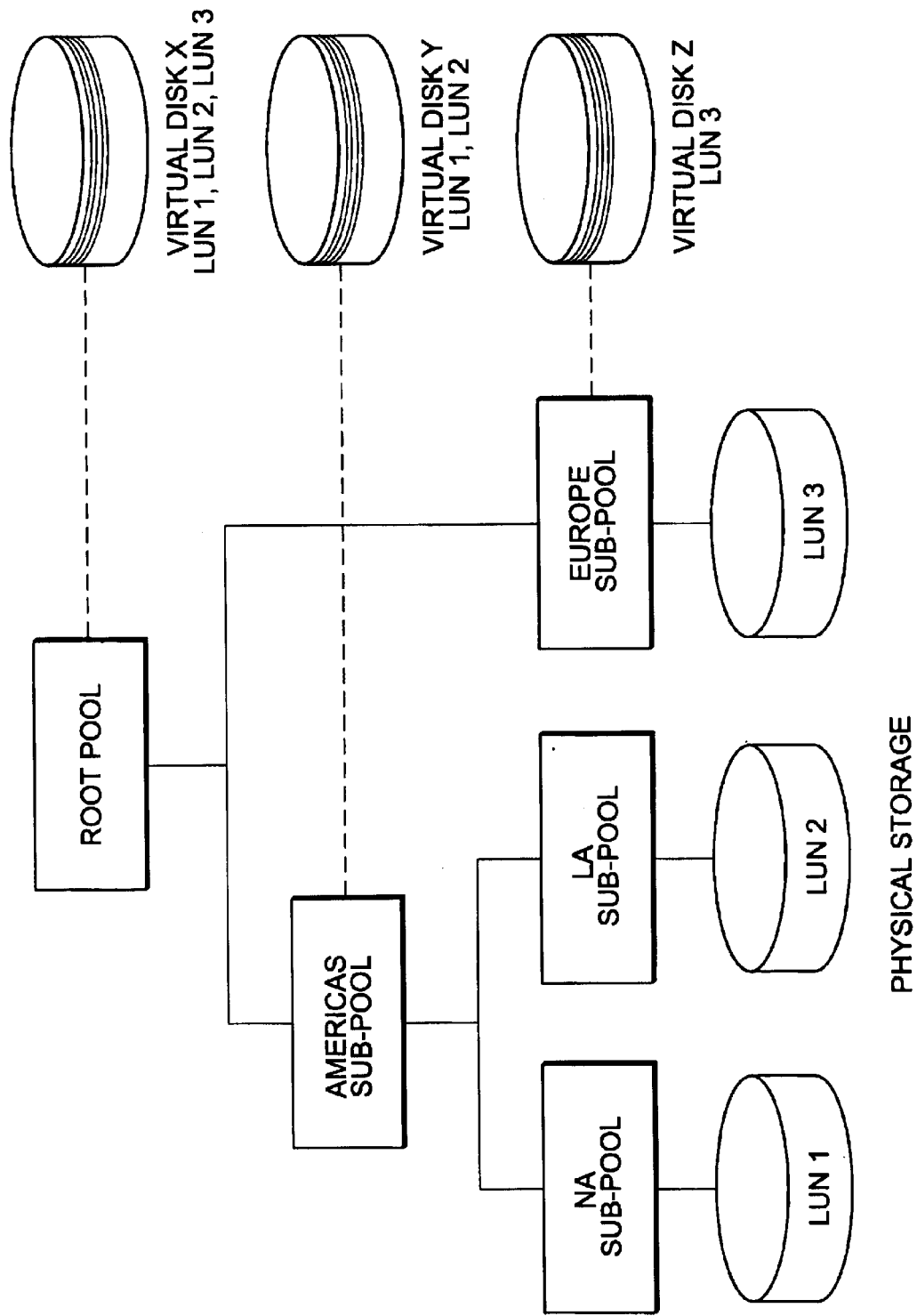
FIG. 4 is a schematic illustration of an illustrative storage pool hierarchy.

FIG. 4 is a schematic diagram that shows an example of one storage pool hierarchy for illustrative purposes. In this non-limiting example, the storage pool hierarchy is selected based on physical location. As previously explained, however, the hierarchy could alternatively be based on other attributes. In this illustration, the virtual disks X, Y and Z reference a "root" pool, an "Americas" sub-pool (having NA and LA sub-pools) and a "Europe" sub-pool, respectively.

In preferred embodiments, the storage pool becomes the focal point of space management. Whenever new space is needed, the virtual disk replica that needs it preferably gets its space in the storage pool associated with that virtual disk replica. It does so by updating the storage committed attribute of the storage pool. It can also use the storage allocated total and storage reserved total to determine if sufficient space is available in the storage pool to satisfy the virtual disk's allocation policy.

In various embodiments, the model can be altered while still taking advantage of one or more benefit of the present invention and some objects can be eliminated in some embodiments. For example, while the virtual disk folder and the host folder hierarchies are helpful for managing the naming of a large number of objects and are helpful for scaling, a subset that leaves out one or more of these objects, but preserves the separation of virtual and physical through the use of, for example, the virtual disk, the virtual disk replica and the storage pool hierarchy can be employed in other embodiments. As another example, models may eliminate the virtual disk replica and move its pool attribute to the virtual disk—e.g., if there is no need to support disaster tolerant replication.

In addition, subsets of objects can be utilized in independent or separate models. As one example, the virtual disk, the virtual disk replica and the storage pool hierarchy are objects that support the separation of the virtual and the physical. Hence, these objects can be used in independent or separate models. As another example, the host, the host agent, the presented unit, the derived unit, and the virtual disk are objects that support the flexible presentation of virtual disks to hosts. Hence, these objects can also be used in independent or separate models. Accordingly, embodiments can be directed to these subsets of objects as well as to other subsets or variations as would be apparent based on this disclosure.

The object-oriented models of the present invention can be used in system implementation, customer documents, training documents, etc., and, most notably, in user interfaces, such as graphical user interfaces (GUIs), command line interfaces (CLIs) and application programming interfaces (APIs) involved in the management of the system.

III. Management Using The Preferred Models

Figure 5:
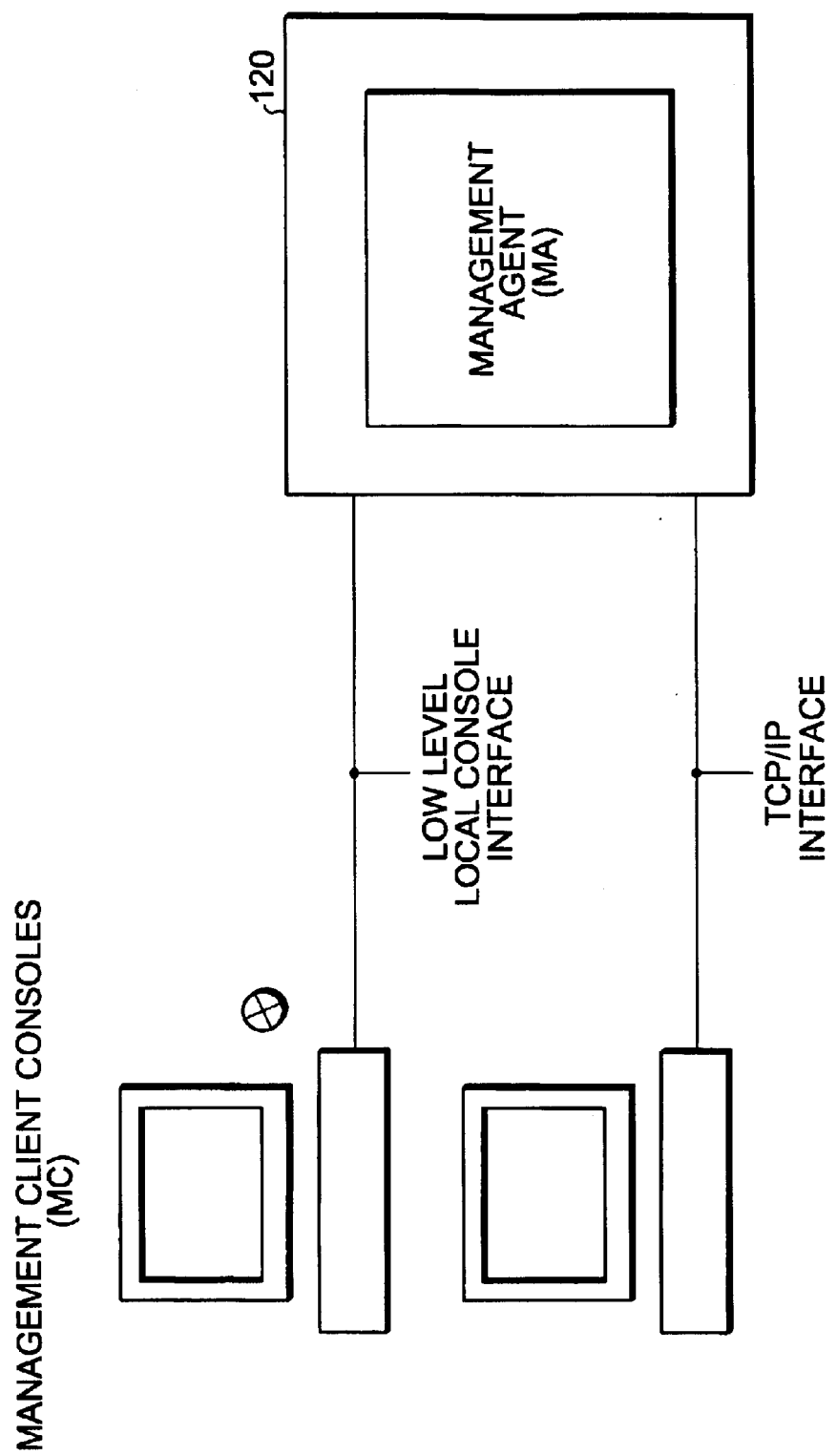
FIG. 5 is a schematic illustration of a management agent and corresponding management consoles that can be used in some preferred embodiments of the invention.

According to some preferred embodiments of the invention, a controller 120, such as that illustrated in the non-limiting examples of FIGS. 1 and 5, is connected to a general purpose network, such as for example a WAN, the Internet, etc., and provides a web-based management interface that can be provided to a client-computer host system with a suitable web browser. In this regard, the controller preferably operates as a server providing the web-based management interface. The hardware and software providing this management interface is referred to herein as a management agent MA. Because the management agent MA offers a web interface in these preferred embodiments, any appropriate computer system with a suitable web browser could potentially operate as a remote management console MC. In this case, a TCP/IP communication, for example, can be established. The interface provided at such a remote management console can include a graphical user interface, a command line interface and/or any other appropriate computer interface. The management console can thus enable a user (e.g., a storage administrator) to manage the virtual storage system. A storage administrator preferably includes one or more person that is responsible for the management and operation of the system.

The management agent MA preferably provides an interface to the manageable objects, provides an engine for executing extrinsic policies, and provides an interface for controlling extrinsic policies. In preferred embodiments, the various object models, discussed herein, describe capabilities of the management agent. In addition, the management agent may include a repository for storing historical management data, persistent state associated with extrinsic policies, etc. Preferably, the management agent also includes general-purpose services for scheduling, event generation, and logging.

In other embodiments, an application programming interface (API) can be provided to the management agent MA. For example, an API can be used in conjunction with various host-side applications or the like. However, a management console need not use the API; API is only one example out of many potential management interfaces.

In some embodiments, a management interface can be provided directly at a host computer system to provide a management interface for the host system. In some embodiments, one or more of the host systems receiving storage services from a system may be configured to issue management commands to the system. For example, a host system may want to make its database consistent and then request a snapshot of the virtual disks that store its database. In addition, once the snapshot is complete, it may want to resume its database.

While the management console MC preferably communicates with the management agent via an open network, the management console can include a computer that communicates via any appropriate communication channel.

As shown in FIG. 5, a management agent MA may have one or more of a variety of managing clients MC. These may include, for example, local and/or remote management consoles, SNMP agents, and/or host systems. For example, the system may include a Simple Network Management Protocol (SNMP) agent able to access the management agent through a local API. This can enable management through SNMP products like NETVIEW, etc.

The system may also include a local instantiation of the management console communicating via a low level local console interface. This might be useful during, for example, initial installation, network configuration, etc.

Figure 6:
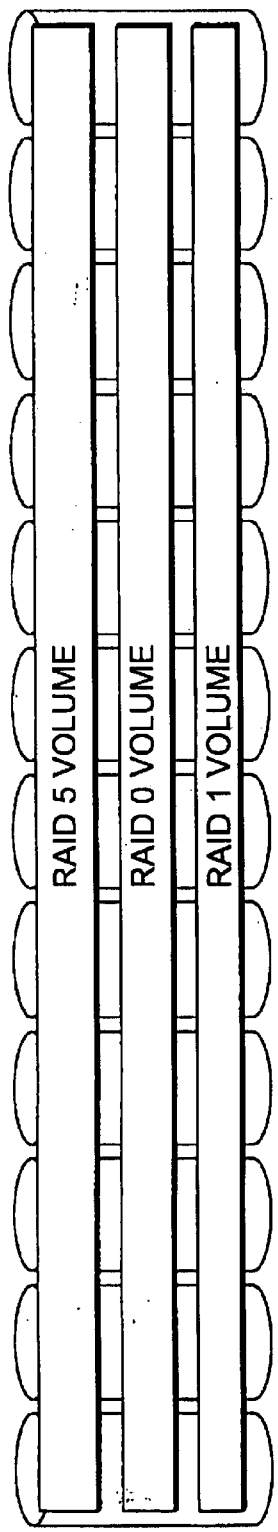
FIGS. 6 and 7 schematically illustrate management operations that can be employed in some preferred embodiments of the present invention.
Figure 7:
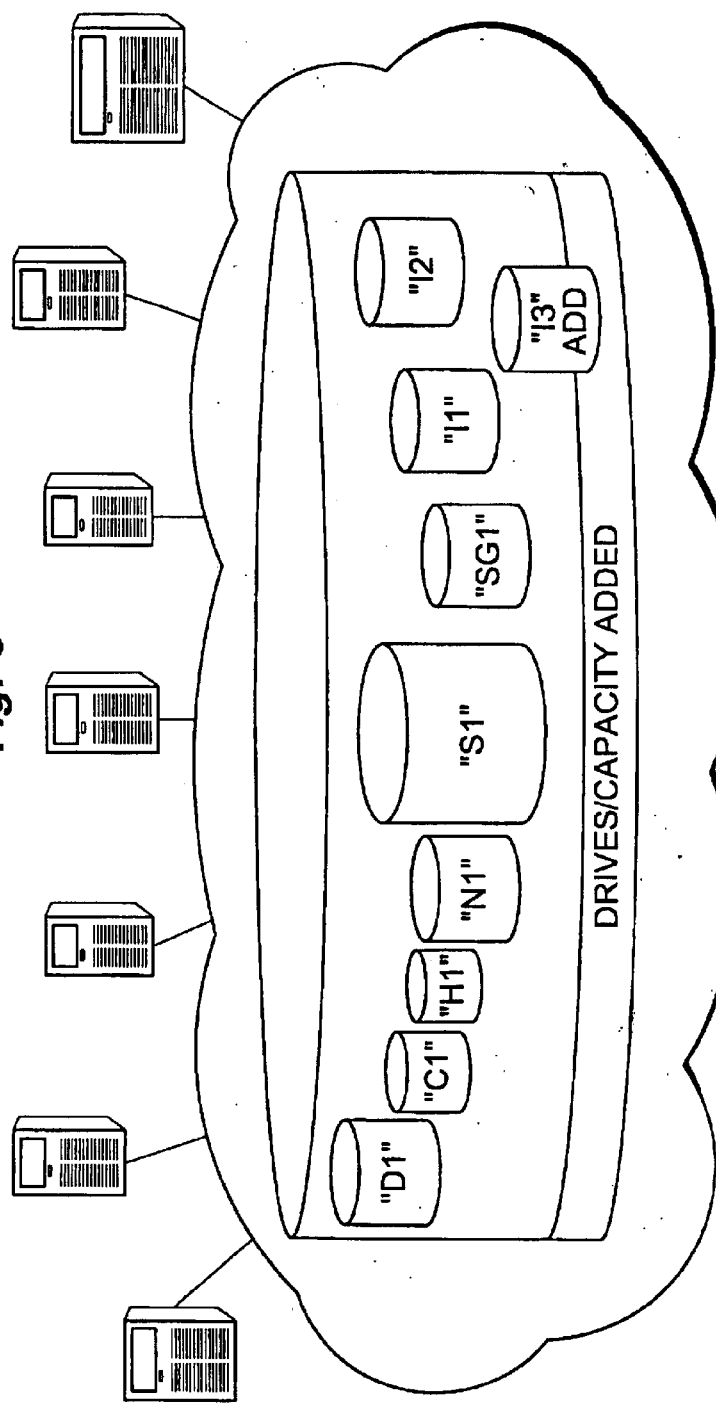

FIG. 6 schematically illustrates that with preferred embodiments of the present invention the workload can be more evenly distributed across all spindles, can greatly reduce throughput bottlenecks, and can avoid load-balancing procedures for applications and databases. FIG. 7 schematically shows that the virtual storage system can provide a single virtual storage pool for numerous host systems (e.g., application servers, etc.), that the preferred embodiments can facilitate on-line, demand driven, capacity redeployment and that the system can facilitate on-line addition of devices and virtual volumes. In preferred embodiments, a user (e.g., a storage administrator) can perform the above operations on-line at a management console MC or other computer interface.

The preferred embodiments of the present invention can create a system having: a single, large pool of storage resources in which virtual disks can be instantiated; any virtual disk that can be presented to any host attached to the system by a management command; and/or a single management domain.

FIGS. 8 to 15 show illustrative graphical user interfaces that can be provided (e.g., via management consoles MC or the like) to facilitate management of the virtual storage in relation to the creation of a virtual disk utilizing a model according to the preferred embodiments of the present invention. These figures merely show some illustrative examples of how a model according to preferred embodiments of the present invention can be presented. Various other graphical user interfaces and/or other interfaces, such as command line interfaces or application programming interfaces, could be used in other embodiments.

In the non-limiting example shown in FIG. 8, virtual disks can be created with a wizard that leads the customer through a series of steps. Using virtual disk navigation, a desired folder is initially selected and a virtual disk menu is brought down to present "new" under "virtual disk."

Figure 9:
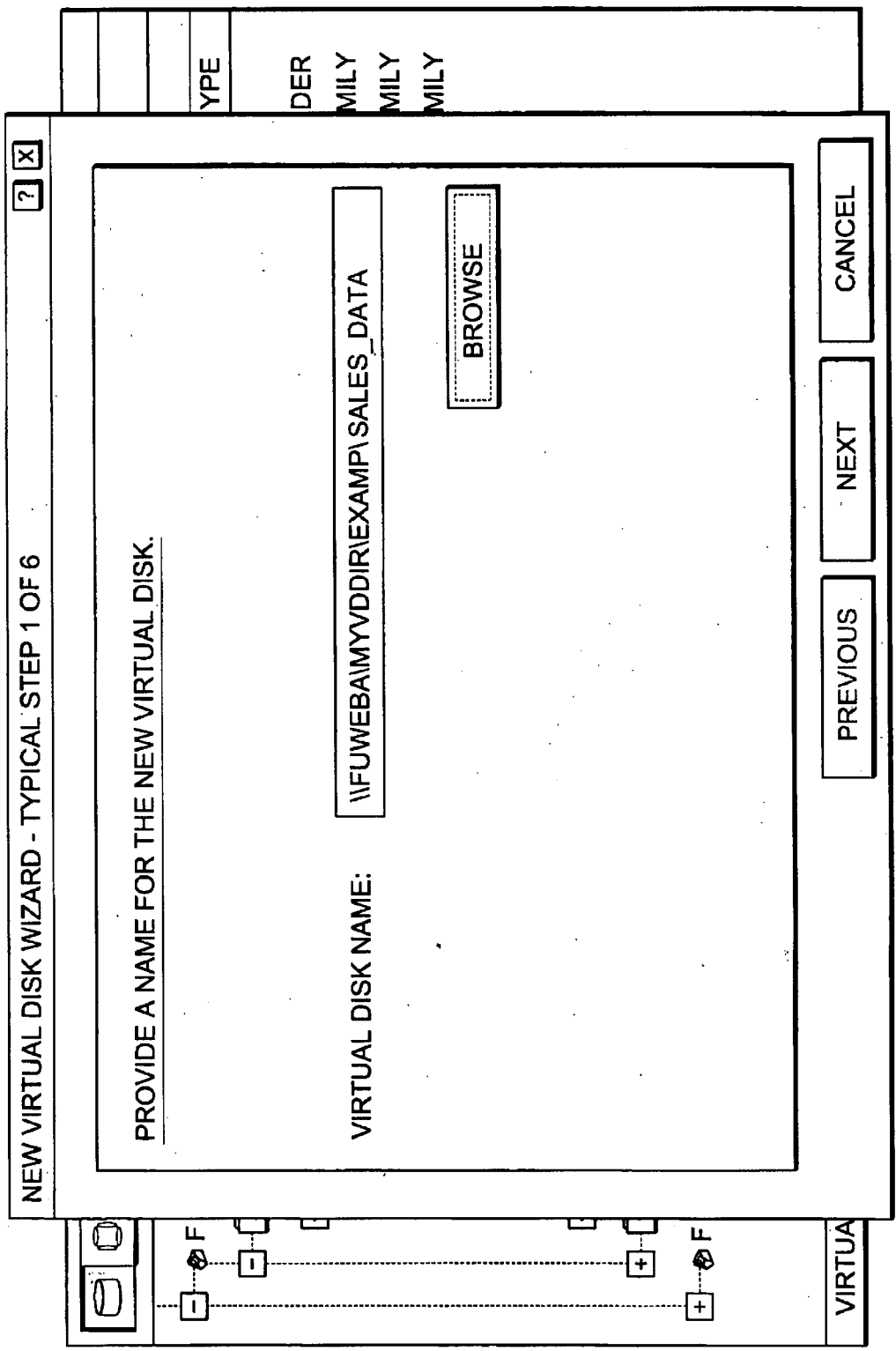

FIG. 9 shows another user screen shot that can be provided with the wizard, requesting that the user enter a family name for the new virtual disk.

Figure 10:
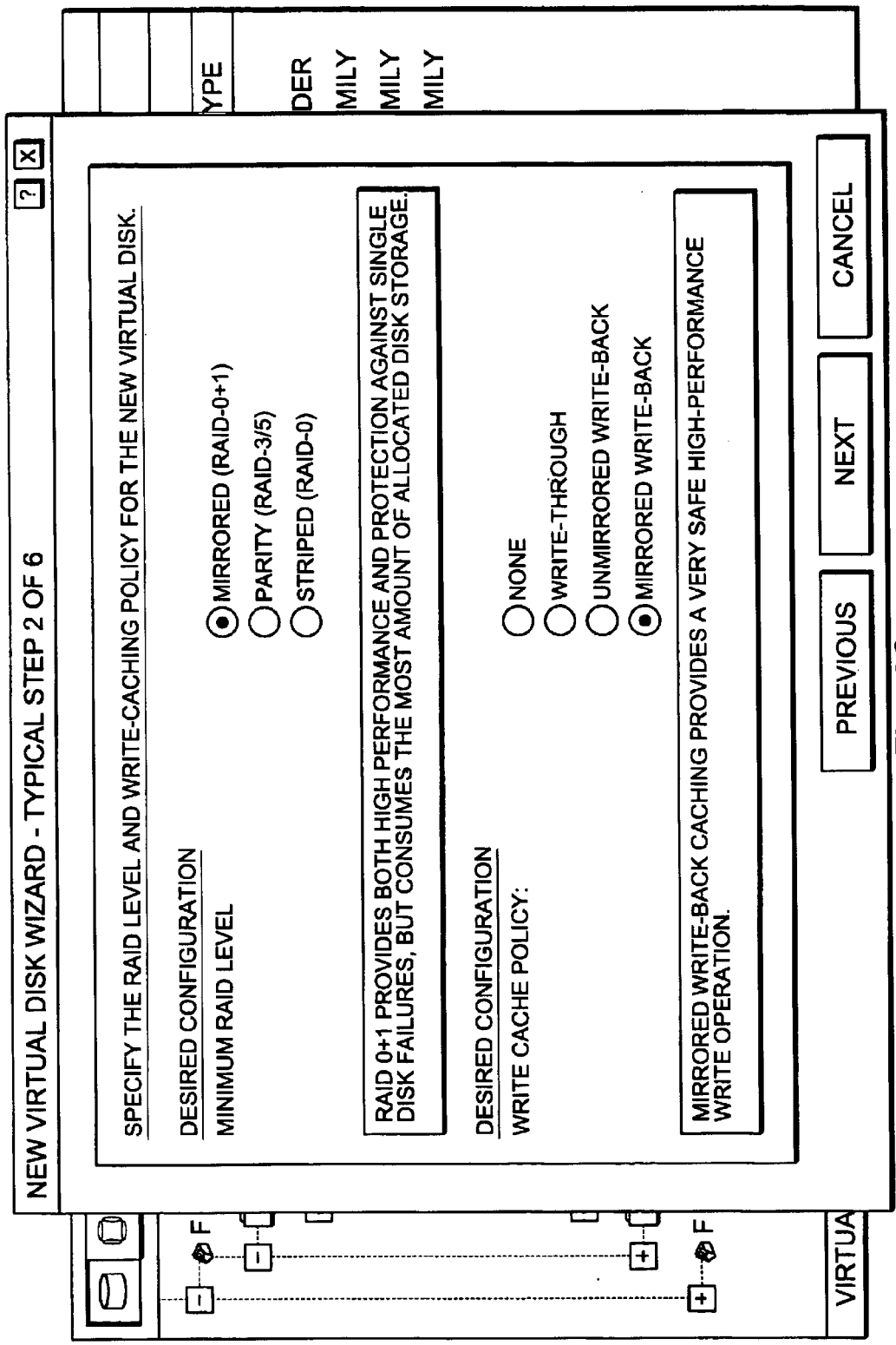

FIG. 10 shows another user screen shot that can be provided with the wizard, requesting that the user specify the RAID level and the write cache policy. In one example, the default can be parity RAID and mirrored write-back cache. The RAID level is preferably specified early in the process because it will affect the allocated storage. Preferably, the RAID level and cache policy are specified together because they both impact performance and reliability.

Figure 11:
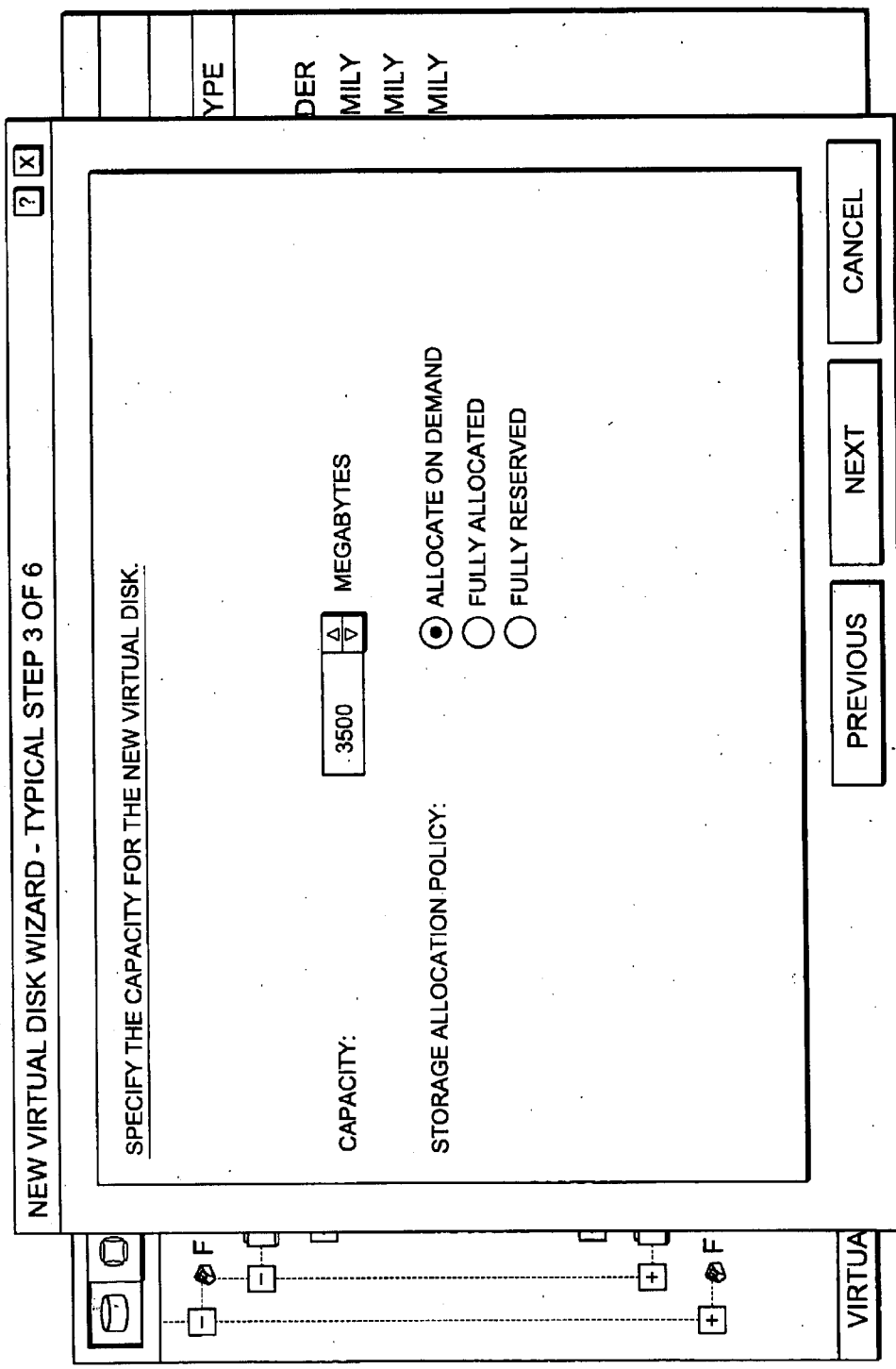

FIG. 11 shows another user screen shot that can be provided with the wizard, requesting that the user provide the capacity for the new virtual disk. In some preferred embodiments, this step would also allow the user to select a storage allocation policy. In some embodiments, all virtual disks can merely be fully allocated. At this point, the system can determine whether there is any storage pool in which a fully allocated virtual disk of the requested size can be created. If the user increases the capacity too high, a message can preferably describe the capacity limit and its relationship to the RAID level and the storage allocation policy.

Figure 12:
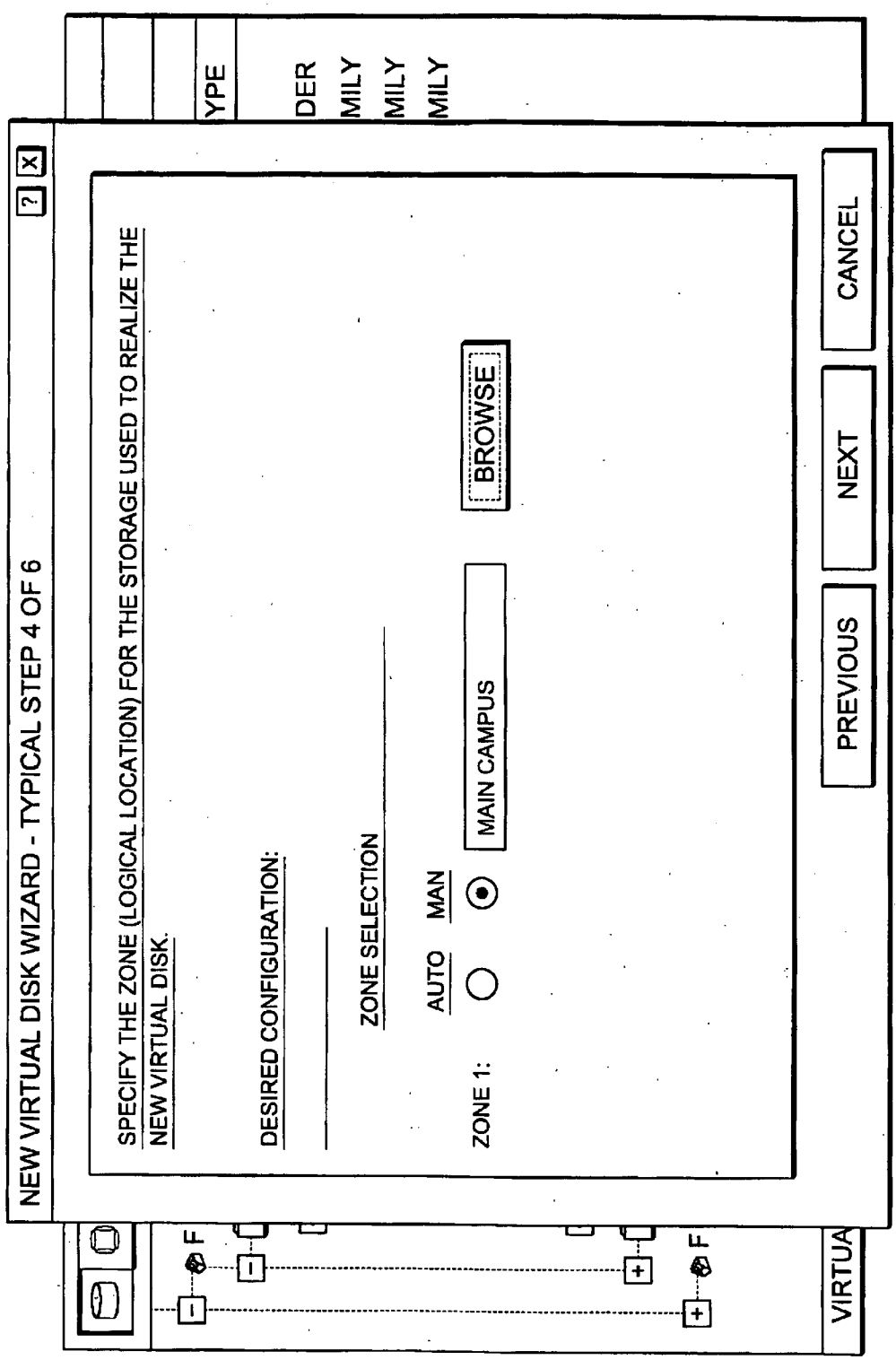

FIG. 12 shows another user screen shot that can be provided with the wizard, requesting that the user specify the location for the new virtual disk. Preferably, a default would be an automatic storage pool or storage pool selection. An automatic storage pool selection will preferably select the largest storage pool that is compatible with the requirements of the virtual disk. Preferably, if the customer selects manual storage pool selection, any storage pools that have insufficient storage will be grayed out (i.e., as non-selectable).

Figure 13:
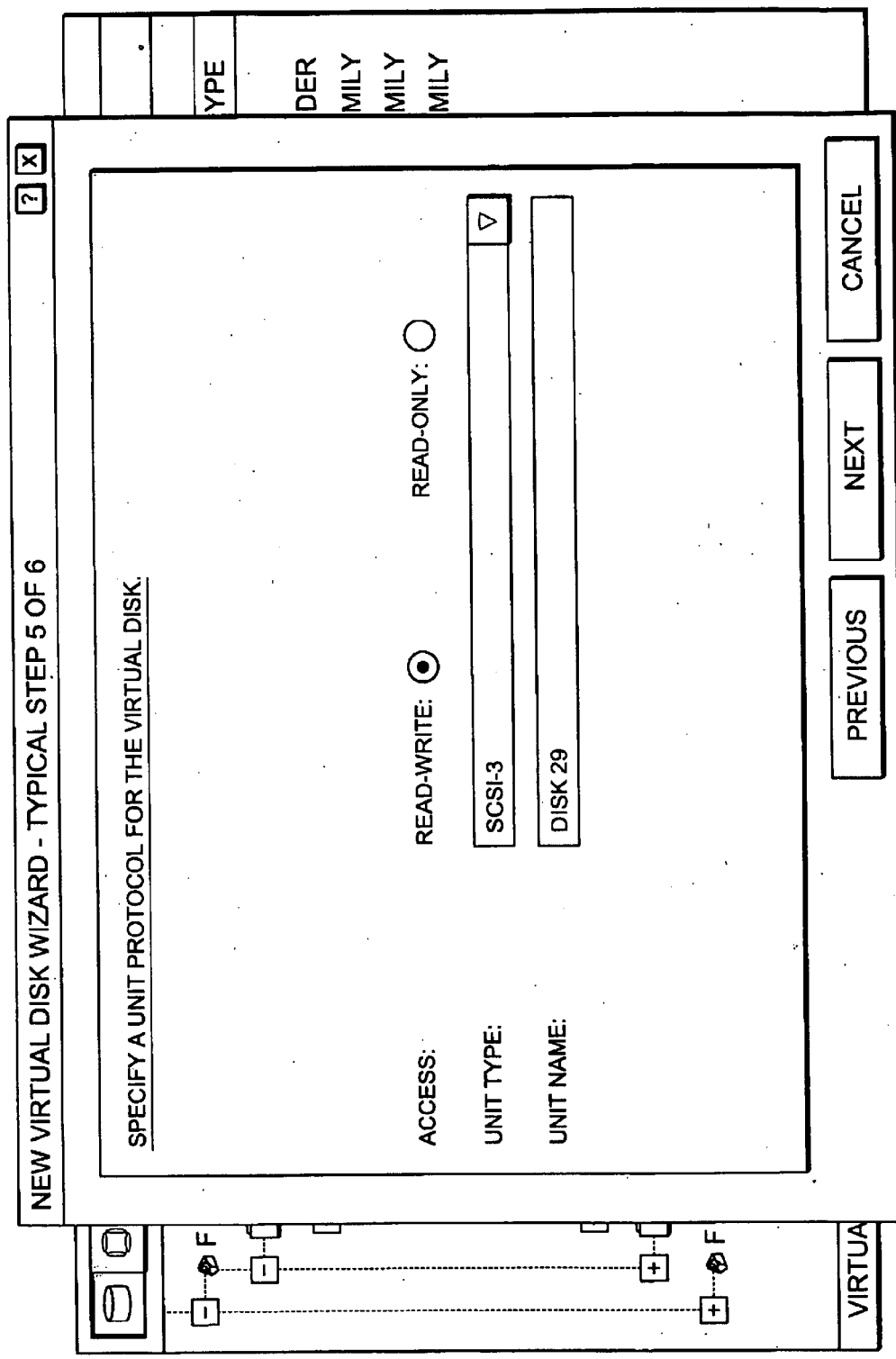

FIG. 13 shows another user screen shot that can be provided with the wizard, requesting that the user specify a derived unit for the virtual disk. Preferably, the customer can optionally specify that the unit is to be read-only. This step preferably selects the derived unit architecture and allows the customer to supply a name.

Figure 14:
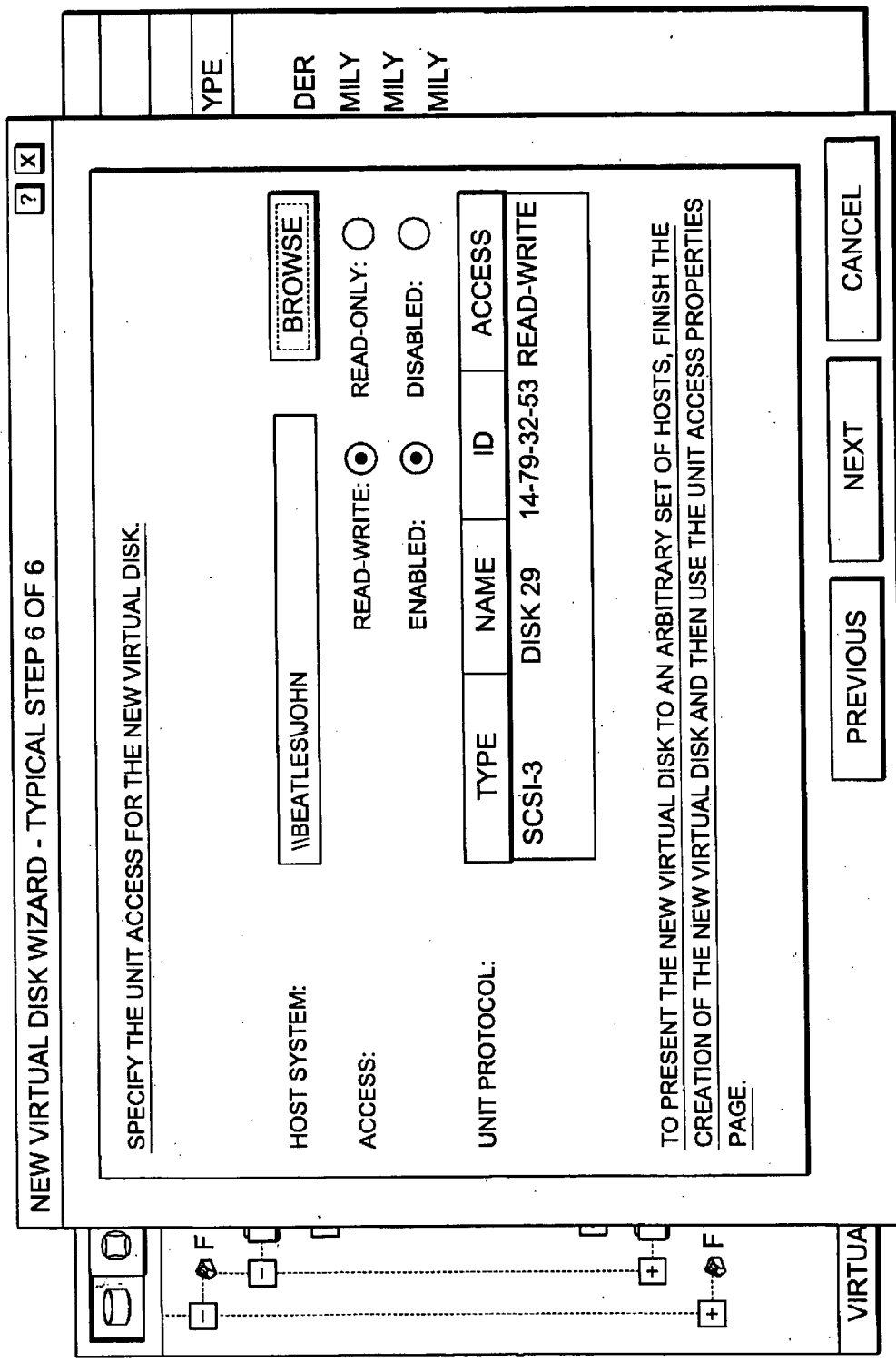

FIG. 14 shows another user screen shot that can be provided with the wizard, requesting that the user specify a host to which the unit is presented. In some embodiments, the user can be allowed to specify a group of hosts cataloged in a like host folder.

Figure 15:
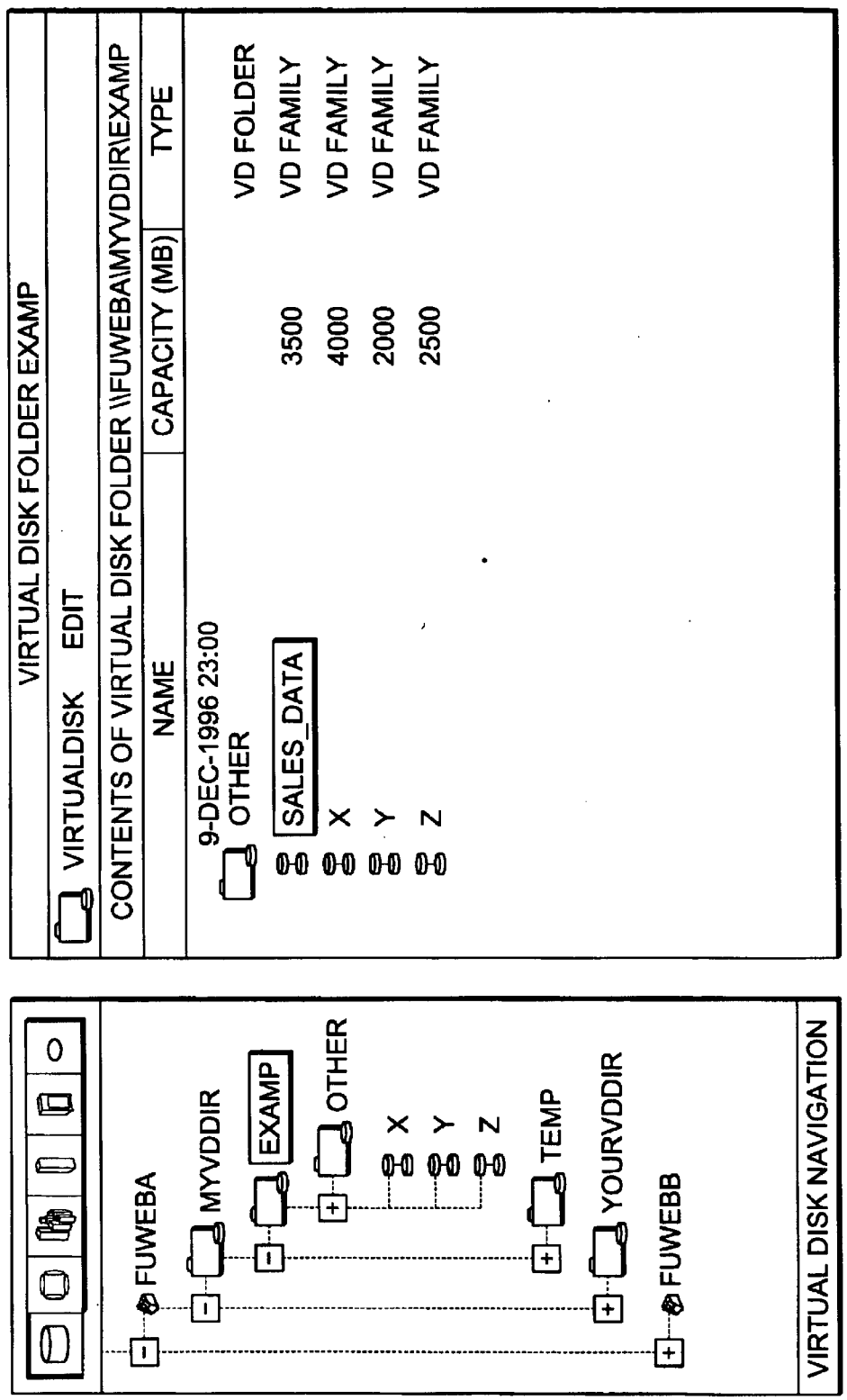

FIG. 15 shows the result of creating a new virtual disk (in the illustrated example, a virtual disk family) with the new virtual disk in the virtual disk folder.

Figure 17:
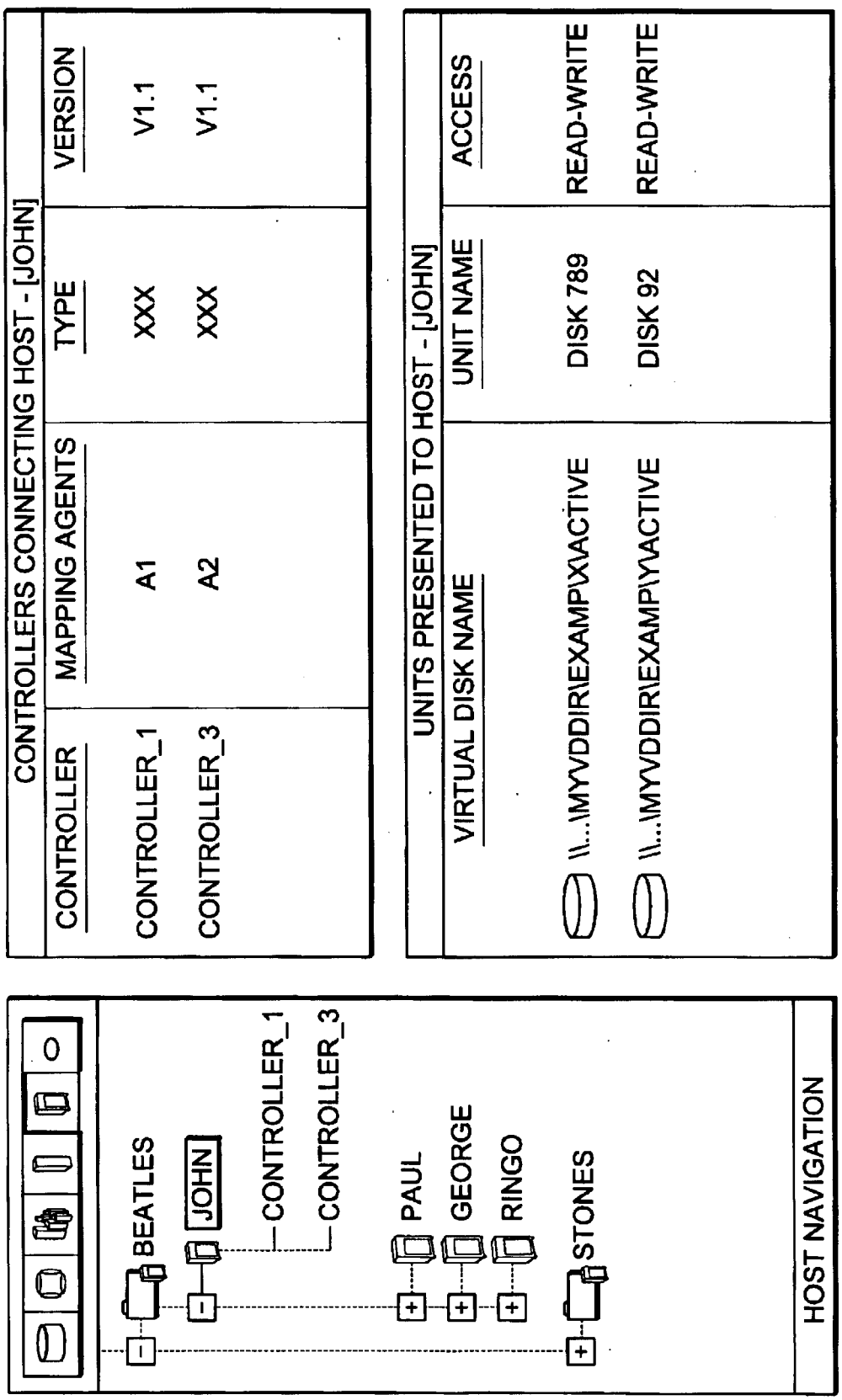
Figure 18:
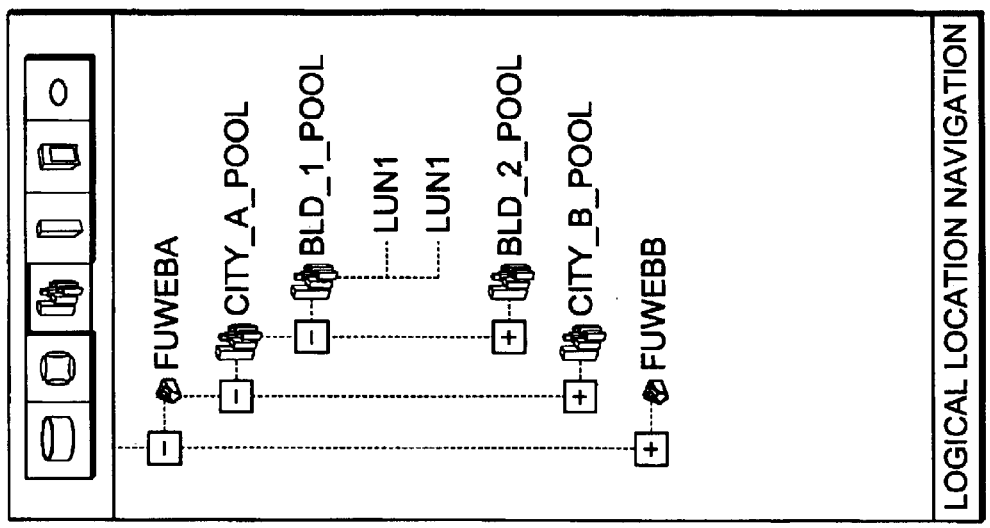

FIGS. 16 to 18 illustrate some exemplary navigational views that can be presented to a user (e.g., via the management station or other interface) to facilitate management of the storage system. In preferred embodiments, a basic user interface will offer multiple navigation views for addressing paradigm shifts (e.g., from physically organized to virtually organized) and for changing from host-centric views to storage-centric views and the like.

In the illustrative embodiment, six buttons B1 to B6 at the top of the navigation pane are provided that enable a user to easily switch between navigation views. Again, this is merely an illustrative case and other embodiments can have more or less views.

FIG. 16 shows an illustrative navigation view by virtual disk (i.e., button B1 is clicked). In this illustrative example, two sub-systems fuweba and fuwebb are shown and the virtual disk directories under one is open. The open directory has three virtual disk families. The members of the selected family are shown in the right-hand pane.

FIG. 17 shows an illustrative navigation view by host (i.e., button B5 is clicked). In this illustrative example, as shown, virtual disks presented to a host may be shown in a separate pane.

FIG. 18 shows an illustrative navigation view by logical location (i.e., button B3 is clicked). Preferably, logical locations are defined by the customer. A logical location may, in some cases, span physical locations. As described above, logical locations are hierarchical and are called storage pools. An LUN is an exemplary primitive storage pool. This picture shows two systems, fuweba and fuwebb. Fuweba has two top-level storage pools defined, the first of which is made up of two second-level storage pools. At the lowest level, each LUN is a storage pool.

Although not illustrated, other navigational views can include storage resource navigational views (i.e., button B2), fibre topology navigational views (i.e., button B6), host navigational views (i.e., button 5) and/or navigation by physical devices (i.e., button 4).

FIGS. 19 to 29 illustrate some exemplary disk management and properties views that can be presented to a user (e.g., via the management station or other interface) to facilitate management and selection of disk properties.

Figure 19:
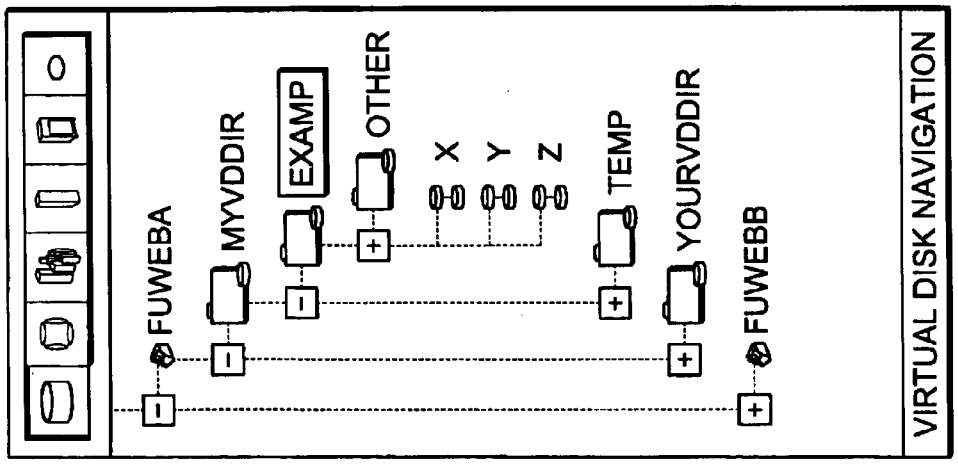

With reference to FIG. 19, an illustrative graphical user interface for virtual disk navigation and management is shown. The right pane shows the contents of the virtual disk folder. Preferably, the virtual disk folder contains either virtual disk families or other virtual disk folders or both. The right pane shows some basic attributes of the objects within the virtual disk folder. In the illustrative embodiment, a menu bar is at the top of the right pane.

Figure 20:
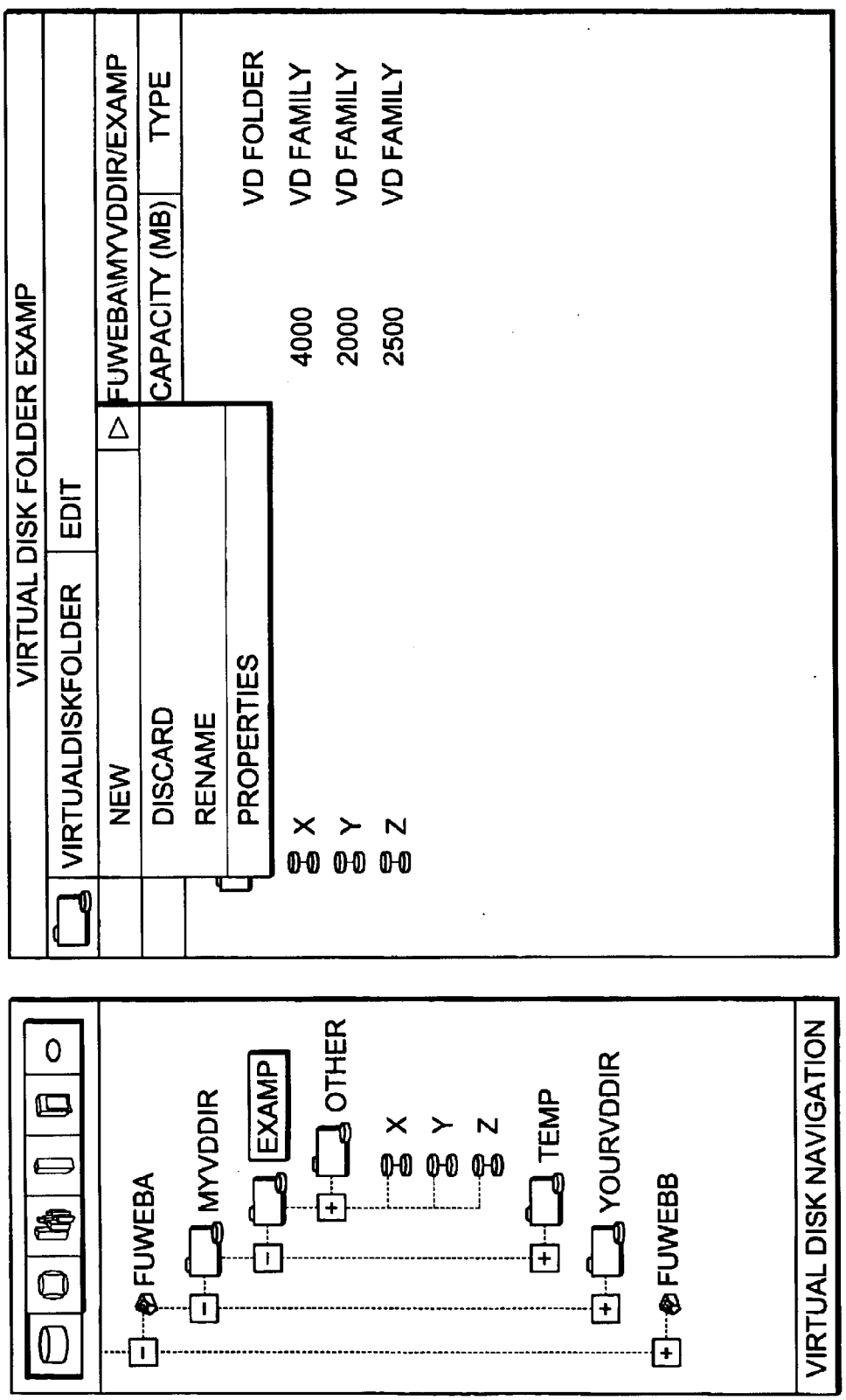

With reference to FIG. 20, this illustrative interface expands the virtual disk menu in the virtual disk folder pane. "New" allows the creation of new virtual disk families and folders (e.g., as described above). "Discard" allows an empty virtual disk folder or family to be eliminated. "Rename" allows a virtual disk folder or family to be renamed. "Properties" displays the virtual disk folder or family properties. Preferably, this can also be done by double-clicking on the icon.

With reference to FIG. 21, this illustrative interface expands the "edit" menu in the virtual disk folder pane. "Cut" and "paste" can preferably be used to move a virtual disk folder or family from its current folder or family to another. Alternatively, this could also be done with drag and drop. In this example, "cut" is grayed out because nothing is selected within the folder and "paste" is grayed out because nothing has been cut. Preferably, there will be no cut without a paste being done.

Figure 22:
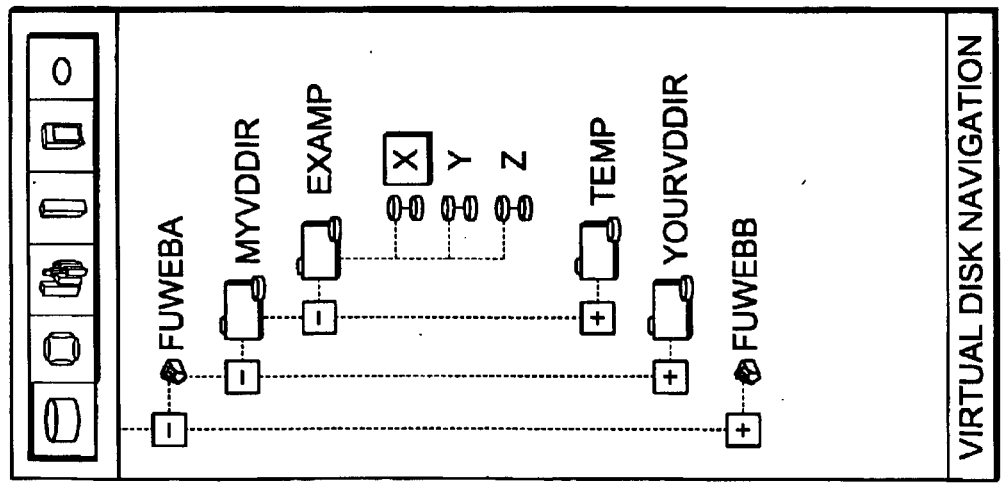
Figure 23:
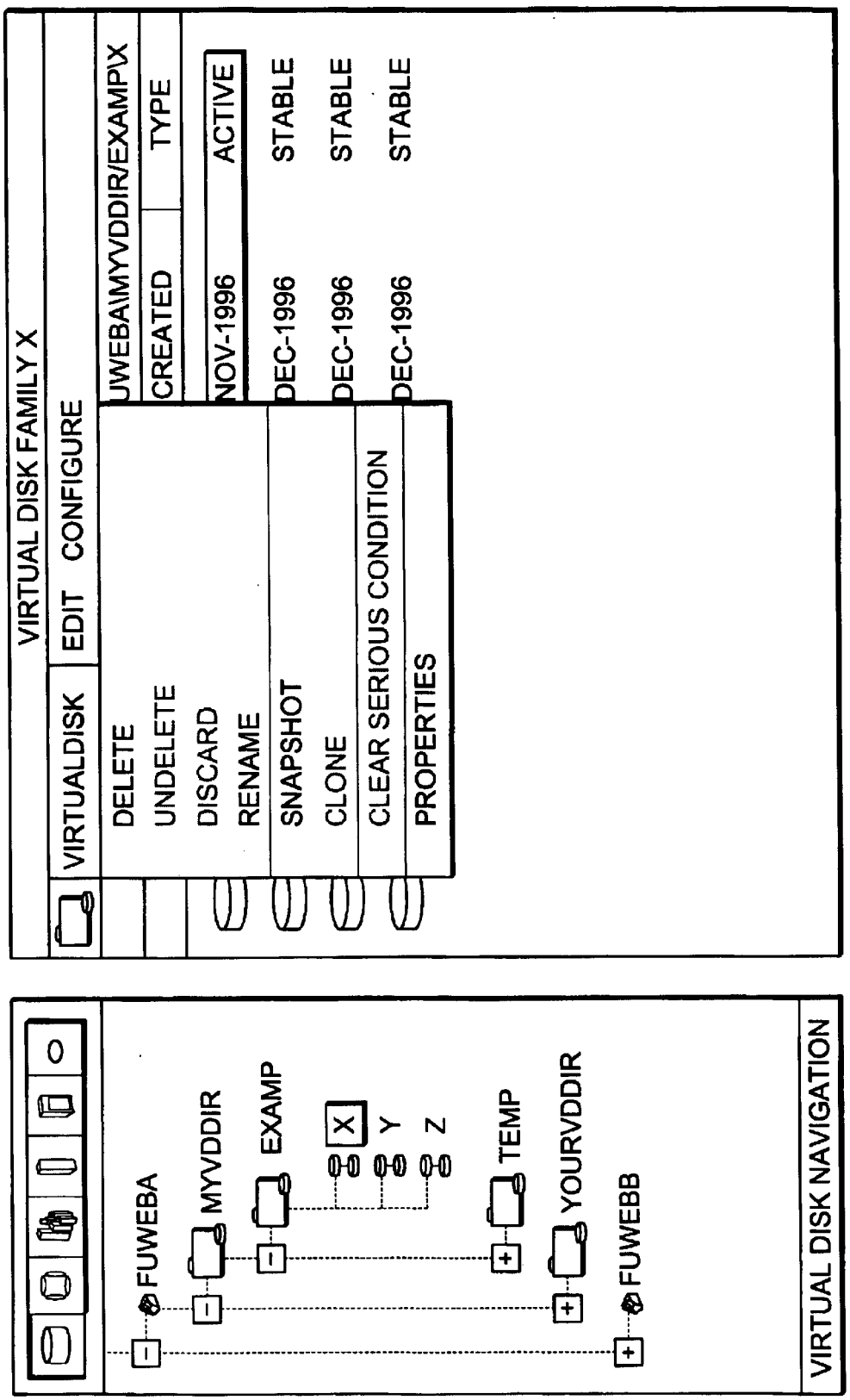

With reference to FIG. 22, this illustrative interface demonstrates operations that may be performed on virtual disks in some embodiments. At the top of the virtual disk detail pane is a menu bar that gives the customer access to virtual disk operations on the selected virtual disk. FIG. 23 shows a list of illustrative virtual disk functions. FIG. 24 shows a list of illustrative virtual disk edit functions. For example, cut and paste may be used to move a virtual disk to another folder. FIG. 25 shows a list of illustrative virtual disk configure functions.

Configure commands can be supplied for controlling, among other things, one or more of the following attributes: write protected; presented; capacity; RAID Level; caching policy; and/or consistency set membership. Preferably, most of these are virtual disk attributes that can be additionally or alternatively managed via a properties page.

FIG. 26 shows an illustrative virtual disk properties page. This particular page shows a graphical user interface that is a general properties page. FIG. 27 shows a virtual disk properties page for unit access. It allows one to create, modify and delete a virtual disk's access control entry (i.e., a presented unit). In this illustrative case, a different tab is used to manage the unit protocol (i.e., derived unit). That is, in this embodiment, derived units are created independently of presented units and hosts. Preferably, presented units are created by selecting a host system and a derived unit and then using the "add" button. In some cases, only the host need be selected. In this embodiment, host selection can be done with a host navigation hierarchy instead of a flat host namespace. In this embodiment, there are details of the presented unit that can advantageously be observed and controlled. In this embodiment, this can be done by highlighting an existing unit access entry and then clicking on "modify." Although not shown, another interface can be displayed that allows the basic parameters of the presented unit to be modified, such as, for example, the host system, the access and/or the derived unit. In addition, it is preferably possible to disable a presented unit. Preferably, a requirement for presented units includes the ability to present a unit to all hosts within a group of hosts. In some embodiments, to effect this, a host folder may be specified as the host system in a presented unit. In that manner, each host system within the host folder could be given equal access.

FIG. 28 is an illustrative GUI screen showing a virtual disk properties page for "unit protocol." This can be used to provide control over the derived unit. In some cases, a derived unit is an abstraction that most administrators can ignore. In this embodiment, operations enabled by this tab can include the creation of a new derived unit, the modification of the read-write/read-only state of an existing derived unit, and the deletion of an existing derived unit with a zero reference count. This page preferably also allows the user to give a derived unit a unit name. Preferably, as with the presented unit page, the derived unit can be modified by highlighting a specific derived unit and then pressing modify. Preferably, doing so can be used to reveal additional architecture-specific attributes of the derived unit.

Figure 29:
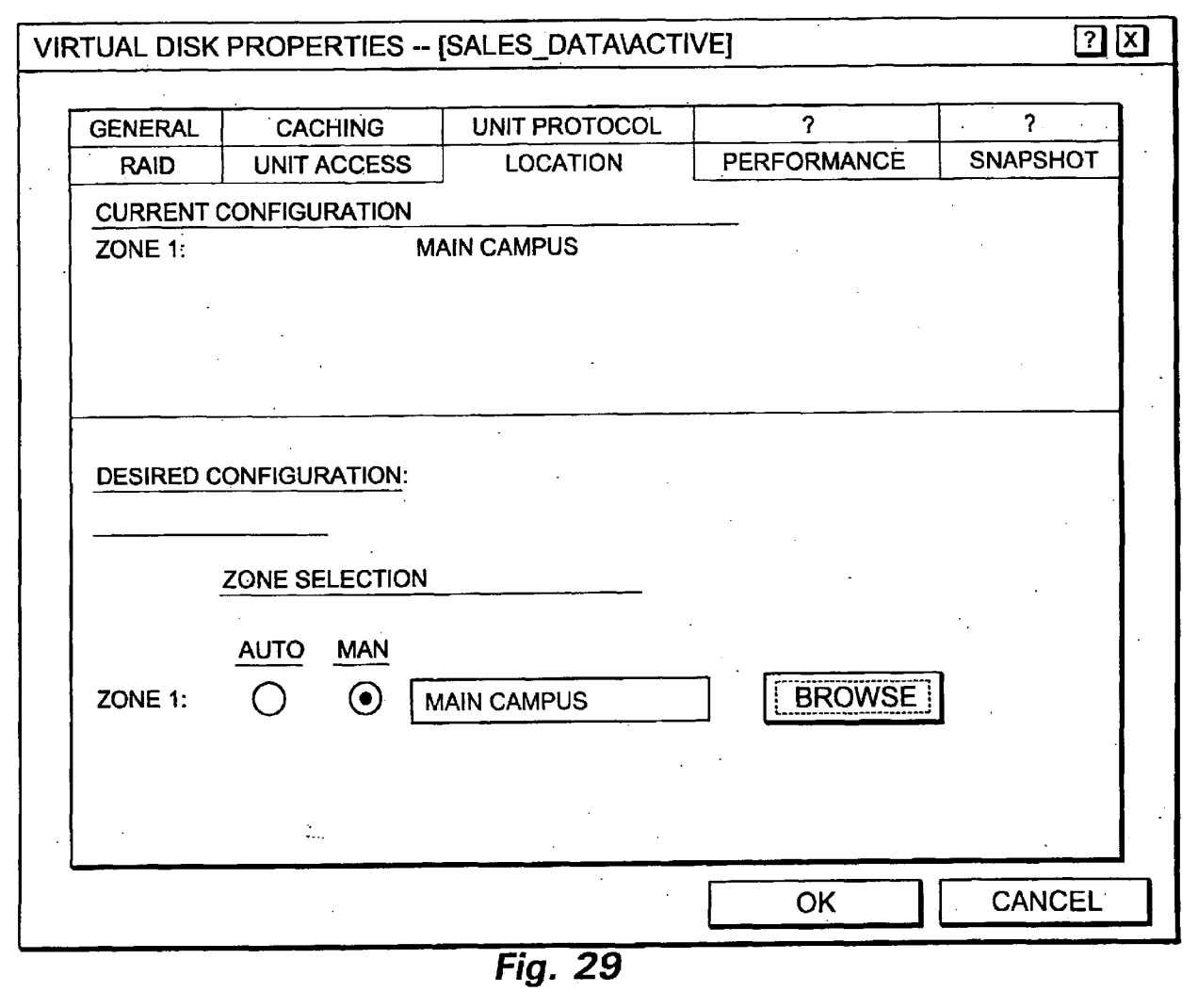

FIG. 29 is an illustrative GUI screen named the "location tab" that enables the customer to manage the location of a virtual disk. In some embodiments, an independence constraint could be added when the pool or storage pool selection is automatic.

While preferred embodiments of the invention have been described, the present invention is not limited to these preferred embodiments, but includes everything encompassed within the scope of the appended claims and all alterations and modifications as would be apparent to those in the art based on this disclosure.

What is claimed is:

1. A computer system for managing virtual storage, comprising:

a host to be presented with virtual storage;

a virtual disk having a block-store independent of physical storage that can be presented to the host;

a host agent to provide mapping to the virtual disk from the host;

a derived unit to add storage protocol to the virtual disk;

a presented unit to associate the virtual disk with the host;

a storage pool hierarchy to encapsulate physical storage within a representative name space that is independent of physical storage;

a storage controller to provide physical storage to the storage pool;

whereby a user can flexibly present the virtual disk to the host and change physical storage components without affecting virtual components via a management interface.

2. The system of claim 1, further including a management interface having a graphical user interface, a command-line interface or an application program interface.

3. The system of claim 1, further including a management console providing an interface for a storage administrator.

4. The system of claim 1, wherein the virtual storage is provided by a storage area network.

5. The system of claim 1, wherein the virtual disk includes at least one virtual disk replica.

6. The system of claim 1, wherein the storage pool hierarchy is arranged into different categories based on user needs.

7. The system of claim 6, wherein the categories are based on physical location.

8. The system of claim 6, wherein each sub-pool in the hierarchy references zero or more data containers and each data container used for virtual storage is referenced by only one sub-pool.

9. The system of claim 5, wherein the virtual disk replica includes an attribute that references one sub-pool, whereby changing the sub-pool or data containers under the sub-pool can cause virtual disk replica storage to migrate.

10. The system of claim 1, wherein the virtual disk includes an attribute that references one sub-pool, whereby changing the sub-pool or data containers under the sub-pool can cause virtual disk storage to migrate.

11. A method in a computer system for facilitating management of virtual storage in a storage area network through separation of physical storage from virtual disks presented to hosts whereby a user can change physical storage components without affecting virtual components via a management interface, comprising:

receiving via a computer interface a storage pool designation to encapsulate physical storage within a representative name space that is independent of physical storage; and presenting a virtual disk, based on an attribute that references a sub-pool, to one or more hosts.

12. The method of claim 11, further including providing the storage pool designation via a management station having a computer interface.

13. The method of claim 12, further including providing the computer interface via a graphical user interface, a command-line interface or an application program interface.

14. The system of claim 11, further including providing the virtual disk with at least one virtual disk replica that includes said attribute that references a sub-pool.

15. A method in a computer system for facilitating management of virtual storage in a storage area network whereby a user can flexibly present a virtual disk to a host, comprising:

connecting a host to a storage area network via a host agent capable of mapping to physical storage locations;

creating a virtual disk having a block-store independent of physical storage that can be presented to the host;

adding storage protocol to the virtual disk using a derived unit in response to a user protocol selection; and associating the virtual disk with a host using a presented unit referencing the host agent in response to a user host selection.

16. The method of claim 15, further including providing the user protocol selection and the user host selection via a management console having a computer interface.

17. The method of claim 15, further including providing the computer interface via a graphical user interface, a command-line interface or an application program interface.

18. The method of claim 15, further including the virtual disk having at least one virtual disk replica.

* * * * *